(12) United States Patent
Devanathan et al.

(10) Patent No.: US 7,958,165 B1
(45) Date of Patent: *Jun. 7, 2011

(54) CONVERTING LOGICAL ASPECTS OF COMMON WAREHOUSE MODEL TO DESIGN ELEMENTS FOR RELATIONAL DATABASE

(75) Inventors: Sriram Devanathan, Irvine, CA (US); Jeffrey Allen Moore, Mission Viejo, CA (US); Joseph Peter Stefaniak, San Clemente, CA (US); Lonnie Dale Sulgrove, Rancho Santa Margarita, CA (US)

(73) Assignee: Unisys Corporation, Blue Bell, PA (US)

( * ) Notice: Subject to any disclaimer, the term of this patent is extended or adjusted under 35 U.S.C. 154(b) by 2069 days.

This patent is subject to a terminal disclaimer.

(21) Appl. No.: 10/716,286

(22) Filed: Nov. 18, 2003

(51) Int. Cl.
*G06F 17/30* (2006.01)
(52) U.S. Cl. .................................................. 707/810
(58) Field of Classification Search .................. 707/100
See application file for complete search history.

(56) References Cited

U.S. PATENT DOCUMENTS

2004/0133581 A1* 7/2004 Shinjo ........................... 707/100

OTHER PUBLICATIONS

Kumpon Farpinyo and Twittie Senivongse; "Designing and Creating Relational Schemas with a CWM-Based Tool"; 2002; Department of Computer Engineering—Chulalongkorn University; pp. 456-461.*
Toby J. Teorey, Dongqing Yang, James P. Fry; "A Logical Design Methodology for Relational Datbases Using the Extended Entity-Relationship Model"; Jun. 1986, ACM Computing Survey (CSUR), vol. 18, issue 2; pp. 197-222.*

* cited by examiner

*Primary Examiner* — Neveen Abel-Jalil
*Assistant Examiner* — Farhan M Syed
(74) *Attorney, Agent, or Firm* — Robert P. Marley; Phoung Quan Hoang

(57) ABSTRACT

A method and a system for converting logical aspects of a common warehouse model (CWM) to corresponding design items for a relational database by processing in a hierarchical manner the logical aspects and creating the corresponding design items. The logical aspects comprise entity-relationship (ER) libraries. The ER libraries comprise ER models. The corresponding design items comprise design libraries. The design libraries comprise design models.

35 Claims, 27 Drawing Sheets

CONVERTING LOGICAL ASPECTS OF COMMON WAREHOUSE MODEL TO DESIGN ELEMENTS FOR RELATIONAL DATABASE

CROSS-REFERENCE TO RELATED APPLICATIONS

This application is related to patent application Ser. No 10/716,287, entitled "Converting Physical Aspects Of Common Warehouse Model To Elements Of Relational Database", filed on the same date and assigned to the same assignee as the present application, the content of which is herein incorporated by reference.

This application is also related to patent application Ser. No. 09/894,785, filed on Jun. 28, 2001, entitled "System and Method for Representing Relational Database Designs using CWM".

BACKGROUND OF THE INVENTION

1. Field of the Invention

The present invention relates generally to methods and systems for converting common warehouse model (CWM) representations to corresponding elements in a relational database, and more particularly to methods and systems for converting the logical aspects of the CWM representations to corresponding elements for database design.

2. Description of Related Art

The Common Warehouse Model (CWM), which is based on the Unified Modeling Language ("UML"), is an industry standard data warehouse interchange protocol. With the use of a data warehouse aware tool that supports CWM, warehouse metadata can be represented in an open standard way. The CWM standard allows users to represent, transform, exchange or otherwise process warehouse metadata. This provides the users with the capability of exchanging, optimizing or debugging software systems that interact with databases.

In contrast, relational database design elements, such as those defined by Structured Query Language (SQL) Server or Oracle databases, are not based on open standards; and, thus are not easily exchanged, processed or represented in a standard way. A database designer's view is limited to that of the proprietary design tools provided by the database manufacturer or that of third party tools.

Thus, a database model that has been designed using the CWM standard cannot be easily transformed into design elements for a relational database or into elements of a relational database. Accordingly, there is a need to translate and represent CWM information as design elements for a relational database or as elements of a relational database, at the database level.

SUMMARY OF THE INVENTION

One embodiment of the present invention is a method for converting logical aspects of a common warehouse model (CWM) to corresponding design items for a relational database by processing in a hierarchical manner the logical aspects and creating the corresponding design items. The logical aspects comprise entity-relationship (ER) libraries. The ER libraries comprise ER models. The corresponding design items comprise design libraries. The design libraries comprise design models.

BRIEF DESCRIPTION OF THE DRAWINGS

The features and advantages of the present invention will become apparent from the following detailed description of the present invention in which.

DETAILED DESCRIPTION OF THE INVENTION

Figure 1:
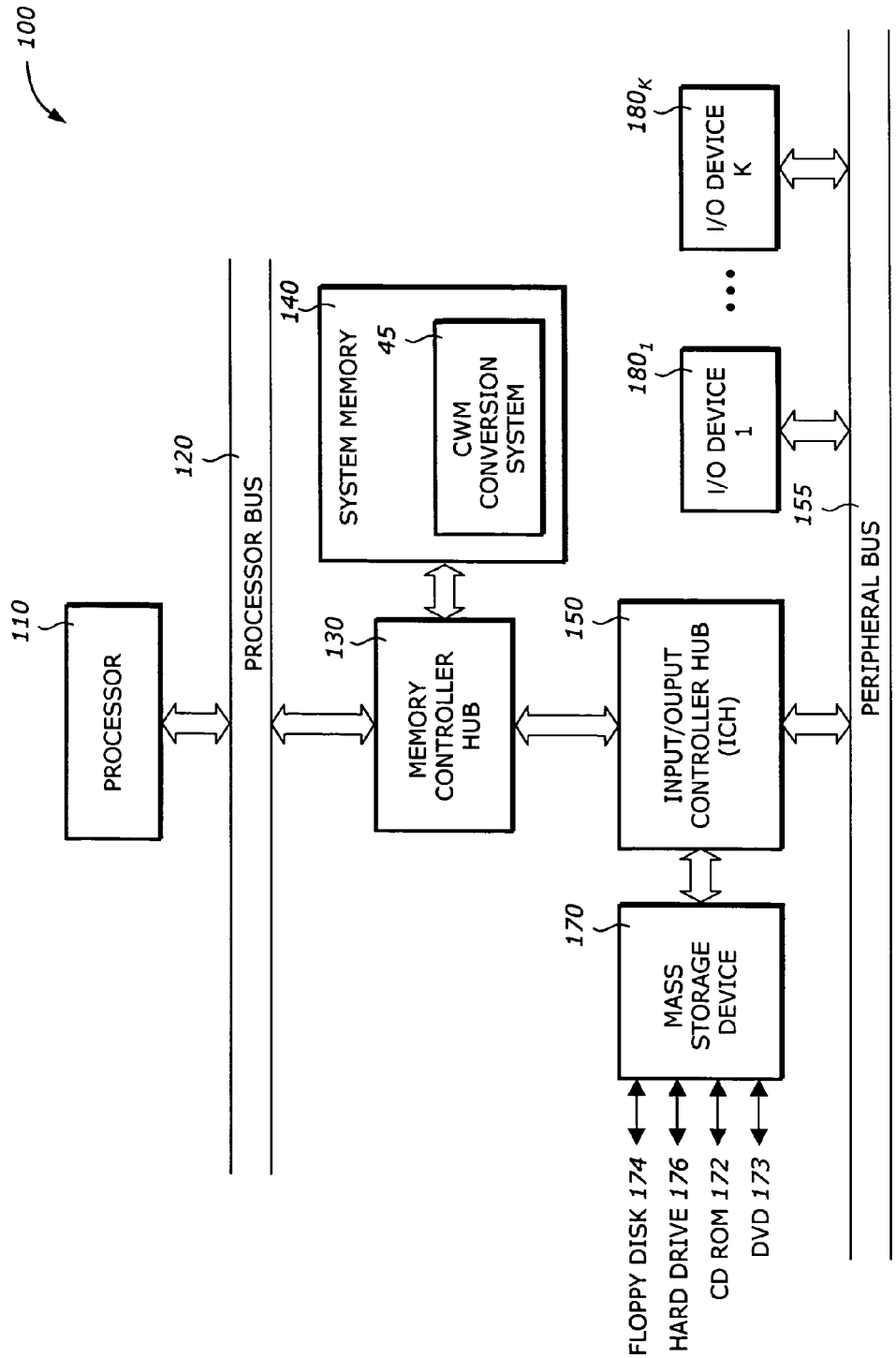
FIG. 1 is a diagram illustrating a computer system 100 in which one embodiment of the invention can be practiced.

One embodiment of the present invention is a method and a system to transform data stored in the common warehouse model (CWM) into design elements for a relational database. Another embodiment of the present invention is a method and a system to transform data stored in the common warehouse model (CWM) into elements of a relational database.

In a first embodiment of the present invention, logical information, also called logical aspects, of the CWM are transformed into database design elements that are outputted to a database design tool.

In a second embodiment of the present invention, the physical information, also called physical aspects, of the CWM are transformed into elements that are outputted to a database management system.

In a third embodiment of the present invention, the logical and physical aspects of the CWM are transformed into database design elements and DBMS elements, respectively, which are outputted to a database design tool and a DBMS, respectively.

Database designs typically have two levels of information, which are logical information and physical information. In the Common Warehouse Model (CWM), the logical information or aspects are usually represented by entity-relationship (ER) diagrams, while the physical aspects are represented by relational elements in the relational design process where the end product is the structure of the database itself. Many of the terms from the ER world (logical) have near-equivalents in the relational world (physical). The following ER terms (logical) in descending hierarchical order: model library, model, entity, attribute, are near-equivalents of these relational terms (physical): catalog, schema, table, column.

The data to be transformed is stored in the common warehouse model (CWM) which defines a structure for the data. This data can be stored in the XML metadata interchange (XMI) format. Alternatively, the data can also be stored in an object-oriented repository.

There are two different types of output from the CWM transformation process. The first type of output is to a database design tool. A database design tool typically uses graphical elements to represent a database. The tool usually provides an application programming interface (API) that enables the programmatic modification of the database design. For this type of output, only the logical aspects of the CWM data need to be transformed.

The second output is to a database management system (DBMS). In this case, the output would typically be in the form of a script, such as Structured Query Language (SQL) script, containing instructions to modify existing or create new elements in the relational database. For this second type of output, only the physical aspects of the CWM data need to be transformed.

Since related items with the same names can be found in both the CWM (i.e., the input) and a database design (i.e., the output), a prefix will be added to the names of related items to distinguish them from one another. The CWM and its extensions contain a number of database, data-warehousing and data-mining related models. Only the ER (i.e., logical) and the relational (i.e., physical) models will be used as inputs. To retain clarity in the description below, items in the CWM will be referred to as ER <name> for items in logical aspects, or relational <name> for items in physical aspects. Some items from the CWM that are common to both ER and relational worlds will be prefixed by CWM. For the output, logical elements typically found in design tools with logical modeling support will be referred to as design <name>. Physical elements typically found in a DBMS or in the physical modeling of DBMS provided in database design tools will be referred to as DBMS <name>.

Throughout the following discussion on the process of processing a CWM item, instructions such as "enumerate all . . ." and "get the properties of . . ." mean reading information from CWM and then storing this information (or pointers to it) in memory structures. Any reference to a design tool or a DBMS is meant to include any alternative recipient of the CWM transformation output. Furthermore, instructions such as "create a DBMS table . . ." may not involve the programmatic creation of an object, but rather the insertion of "create table" statements in a script that can be used to create the output database.

FIG. 1 is a diagram illustrating a computer system 100 in which one embodiment of the invention can be practiced. The system 100 includes a processor 110, a processor bus 120, a memory control hub (MCH) 130, a system memory 140, an input/output control hub (ICH) 150, a peripheral bus 155, a mass storage device 170, and input/output devices $180_1$ to $180_K$. Note that the system 100 may include more or less elements than these elements.

The processor 110 represents a central processing unit of any type of architecture, such as embedded processors, mobile processors, micro-controllers, digital signal processors, superscalar computers, vector processors, single instruction multiple data (SIMD) computers, complex instruction set computers (CISC), reduced instruction set computers (RISC), very long instruction word (VLIW), or hybrid architecture.

The processor bus 120 provides interface signals to allow the processor 110 to communicate with other processors or devices, e.g., the MCH 130. The host bus 120 may support a uni-processor or multiprocessor configuration. The host bus 120 may be parallel, sequential, pipelined, asynchronous, synchronous, or any combination thereof.

The MCH 130 provides control and configuration of memory and input/output devices such as the system memory 140 and the ICH 150. The MCH 130 may be integrated into a chipset that integrates multiple functionalities such as the isolated execution mode, host-to-peripheral bus interface, memory control. The MCH 130 interfaces to the peripheral bus 155. For clarity, not all the peripheral buses are shown. It is contemplated that the system 100 may also include peripheral buses such as Peripheral Component Interconnect (PCI), accelerated graphics port (AGP), Industry Standard Architecture (ISA) bus, and Universal Serial Bus (USB), etc.

The system memory 140 stores system code and data. The system memory 140 is typically implemented with dynamic random access memory (DRAM) or static random access memory (SRAM). The system memory may include program code or code segments implementing one embodiment of the invention. The system memory includes a Common Warehouse Model (CWM) conversion system 45. Any one of the elements of the CWM conversion system 45 may be implemented by hardware, software, firmware, microcode, or any combination thereof. The system memory 140 may also include other programs or data that are not shown, such as an operating system. The CWM conversion system 45 may implement all or part of the CWM conversion functions. The CWM conversion system 45 may also simulate the CWM conversion functions. The CWM conversion system 45 contains instructions that, when executed by the processor 110, causes the processor to perform the tasks or operations as described in the following.

The ICH 150 has a number of functionalities that are designed to support I/O functions. The ICH 150 may also be integrated into a chipset together or separate from the MCH 130 to perform I/O functions. The ICH 150 may include a number of interface and I/O functions such as PCI bus interface to interface to the peripheral bus 155, processor interface, interrupt controller, direct memory access (DMA) controller, power management logic, timer, system management bus (SMBus), universal serial bus (USB) interface, mass storage interface, low pin count (LPC) interface, etc.

The mass storage device 170 stores archive information such as code, programs, files, data, databases, applications, and operating systems. The mass storage device 170 may include compact disk (CD) ROM 172, a digital video/versatile disc (DVD) 173, floppy drive 174, and hard drive 176, and any other magnetic or optic storage devices such as tape drive, tape library, redundant arrays of inexpensive disks (RAIDs), etc. The mass storage device 170 provides a mechanism to read machine-accessible media. The machine-accessible media may contain computer readable program code to perform tasks as described in the following.

The I/O devices 180$_1$ to 180K may include any I/O devices to perform I/O functions. Examples of I/O devices 180$_1$ to 180K include controller for input devices (e.g., keyboard, mouse, trackball, pointing device), media card (e.g., audio, video, graphics), network card such as Institute of Electrical and Electronics Engineers (IEEE) 802.3, IEEE-1394, IEEE-802.11x, Bluetooth, and any other peripheral controllers.

Elements of one embodiment of the invention may be implemented by hardware, firmware, software or any combination thereof. The term hardware generally refers to an element having a physical structure such as electronic, electromagnetic, optical, electro-optical, mechanical, electro-mechanical parts, etc. The term software generally refers to a logical structure, a method, a procedure, a program, a routine, a process, an algorithm, a formula, a function, an expression, etc. The term firmware generally refers to a logical structure, a method, a procedure, a program, a routine, a process, an algorithm, a formula, a function, an expression, etc., that is implemented or embodied in a hardware structure (e.g., flash memory, ROM, EROM). Examples of firmware may include microcode, writable control store, micro-programmed structure. When implemented in software or firmware, the elements of an embodiment of the present invention are essentially the code segments to perform the necessary tasks. The software/firmware may include the actual code to carry out the operations described in one embodiment of the invention, or code that emulates or simulates the operations. The program or code segments can be stored in a processor or machine accessible medium or transmitted by a computer data signal embodied in a carrier wave, or a signal modulated by a carrier, over a transmission medium. The "processor readable or accessible medium" or "machine readable or accessible medium" may include any medium that can store, transmit, or transfer information. Examples of the processor readable or machine accessible medium include an electronic circuit, a semiconductor memory device, a read only memory (ROM), a flash memory, an erasable ROM (EROM), a floppy diskette, a compact disk (CD) ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc. The machine accessible medium may be embodied in an article of manufacture. The machine accessible medium may include data that, when accessed by a machine, cause the machine to perform the operations described in the following. The machine accessible medium may also include program code embedded therein. The program code may include machine-readable code to perform the operations described in the following. The term "data" here refers to any type of information that is encoded for machine-readable purposes. Therefore, it may include program, code, data, file, etc.

All or part of an embodiment of the invention may be implemented by hardware, software, or firmware, or any combination thereof. The hardware, software, or firmware element may have several modules coupled to one another. A hardware module is coupled to another module by mechanical, electrical, optical, electromagnetic or any physical connections. A software module is coupled to another module by a function, procedure, method, subprogram, or subroutine call, a jump, a link, a parameter, variable, and argument passing, a function return, etc. A software module is coupled to another module to receive variables, parameters, arguments, pointers, etc. and/or to generate or pass results, updated variables, pointers, etc. A firmware module is coupled to another module by any combination of hardware and software coupling methods above. A hardware, software, or firmware module may be coupled to any one of another hardware, software, or firmware module. A module may also be a software driver or interface to interact with the operating system running on the platform. A module may also be a hardware driver to configure, set up, initialize, send and receive data to and from a hardware device. An apparatus may include any combination of hardware, software, and firmware modules.

One embodiment of the invention may be described as a process which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a program, a procedure, etc.

Figure 2:
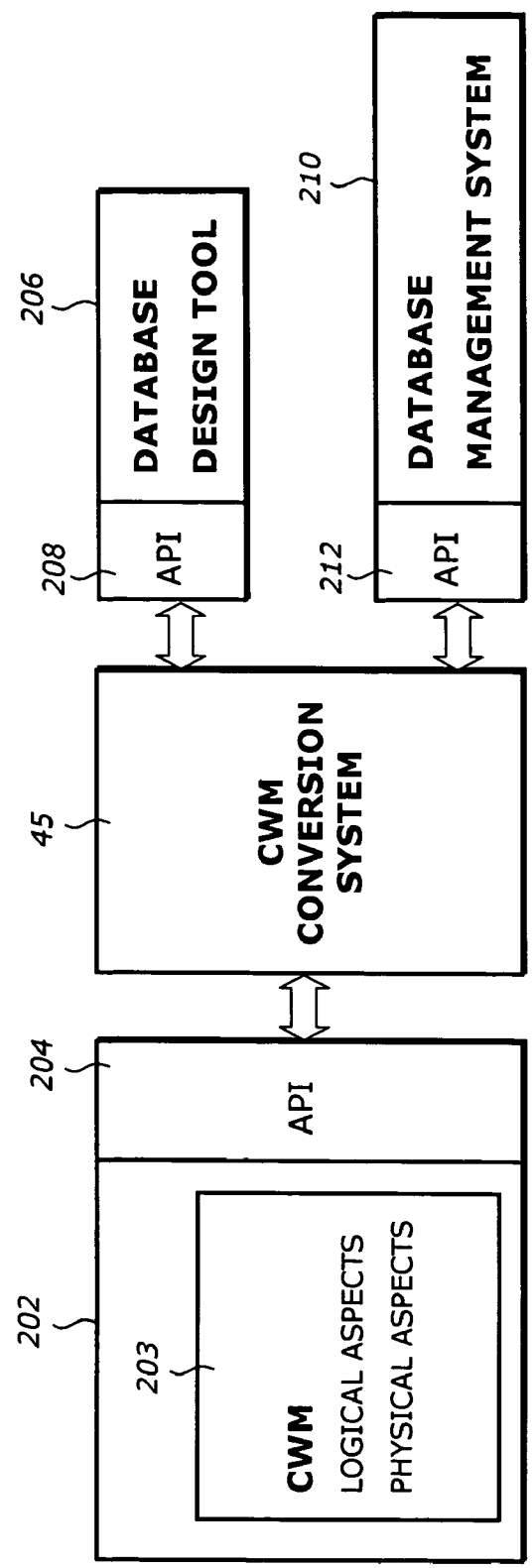
FIG. 2 is a block diagram showing the inputs and outputs of the CWM conversion system 45 of FIG. 1.

FIG. 2 is a block diagram showing the inputs and outputs of the CWM conversion system 45 of FIG. 1. The CWM conversion system 45 reads the CWM representations 203 stored in the storage system 202 via the Application Programming Interface (API) 204 of the storage system 202, and transform the CWM representations into corresponding relational database elements. The type of data to be read from the storage system 202 and the format of the output of the CWM conversion system depend on the type of the output recipient. If the output recipient is a database design tool 206, the CWM conversion system 45 transforms the logical aspects of the CWM into design items in a design tool for a relational database. The CWM conversion system 45 communicates with the database design tool 206 via the API 208 of the tool 206. If the output recipient is a database management system (DBMS) 210, the CWM conversion system 45 transforms the physical aspects of the CWM to corresponding database management system (DBMS) representation in a relational database. The CWM conversion system 45 communicates with the database management system (DBMS) 210 via the API 212 of the DBMS 210. In one embodiment, the CWM conversion system 45 can also read both the CWM logical aspects and physical aspects and produces the two respective outputs.

The CWM conversion system 45 processes a CWM representation in a hierarchical manner in order to transform the CWM representation into elements of a relational database. The CWM conversion system 45 processes the topmost (logical or physical) elements first. The high-level structure generated so far is outputted to the database design tool 206 or the DBMS 210. This sets up the framework for the output of the rest of the conversion of the CWM.

Figure 3:
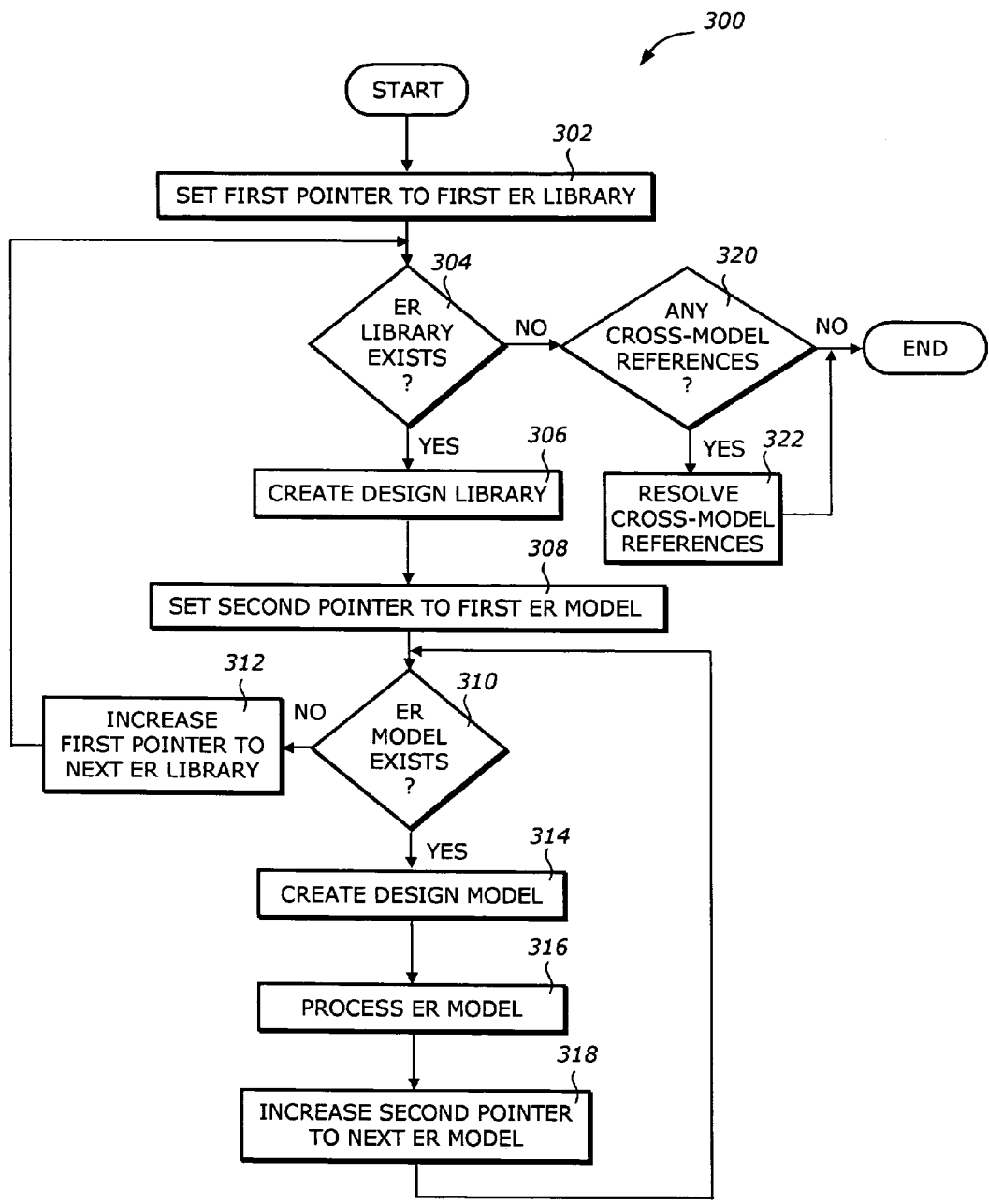
FIG. 3 is a flowchart illustrating the process 300 of converting the logical aspects of a common warehouse model (CWM) to corresponding design items in a relational database.

FIG. 3 is a flowchart illustrating the process 300 of converting the logical aspects of a CWM to corresponding design items in a relational database. The logical aspects of the CWM comprise entity-relationship (ER) libraries. Each of the ER libraries comprises ER models. The corresponding design items in the relational database comprises design libraries, each of the design libraries comprises design models. Process 300 can output the design items to a design tool 206 (FIG. 2) for database design.

Process 300 scans through the ER libraries. For each of the ER libraries, that is being scanned, process 300 creates a corresponding design library in the relational database. For each of the ER models in the ER library being scanned, process 300 creates a corresponding design model in the corresponding design library to hold the corresponding information. Process 300 processes each of the ER models to produce the corresponding information for the corresponding design model. Process 300 processes each of the ER models independently of the other ER models. After all the ER models are processed, process 300 determines if there are any references between the ER models, that is, references across the boundaries of the ER models. If there are any such cross-model references, process 300 makes corresponding cross-model references in the corresponding design models then terminates. Detailed description of process 300 is as follows.

Upon Start, process 300 sets a first pointer to the first ER library (block 302). Process 300 checks whether this ER library exists (block 304). If it does not exist, process 300 checks whether there are any references between the ER models, that is, references across the boundaries of the ER models (block 320). If there is no such cross-model reference, process 300 terminates. If there are any cross-model references, process 300 makes corresponding cross-model references in the corresponding design models (block 322) then terminates. If the ER library being pointed to exists, process 300 creates a corresponding design library (306). Process 300 sets a second pointer to the first ER model in the ER library (block 308). Process 300 checks whether this ER model exists (block 310). If it does not exist, process 300 increases the first pointer to point to the next ER library (block 312) and goes back to block 304. If the ER model exists, process 300 creates a corresponding design model (block 314). Process 300 processes the ER model (block 316). This processing of the ER model is described in detail later in connection with FIG. 4 through FIG. 12. Process 300 then increases the second pointer to point to the next ER model (block 318) and goes back to block 310.

Figure 4:
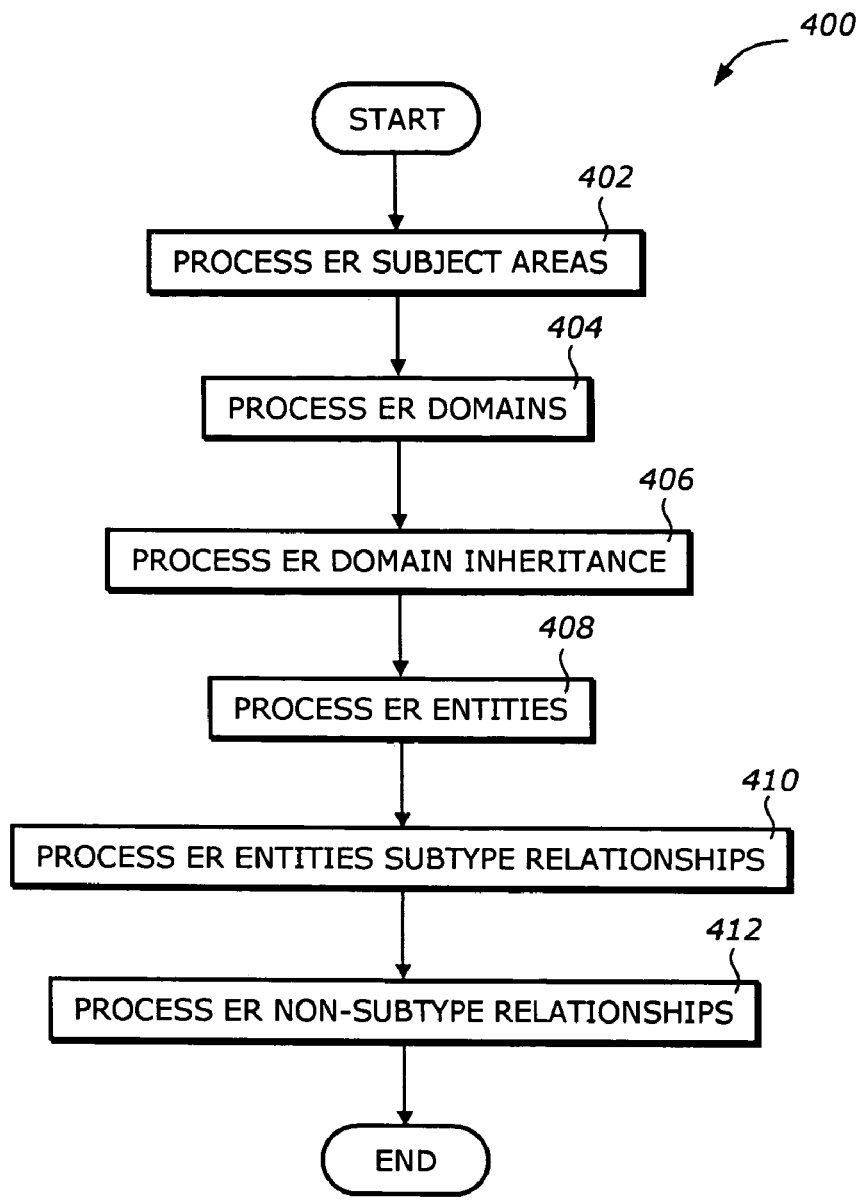
FIG. 4 is a flowchart of an embodiment 400 of block 316 of FIG. 3, illustrating the processing of an ER model to produce a corresponding design model.

FIG. 4 is a flowchart of an embodiment 400 of block 316 of FIG. 3, illustrating the processing of an ER model to produce a corresponding design model for the relational database.

Upon Start, process 400 processes the ER subject areas included in the ER model (block 402). Subject areas constitute a way of organizing the tables for understanding purposes (note that tables are only linked to the subject areas, not included therein). For this reason, subject areas can only exist in the logical aspects of the CWM, not in the physical aspects of the CWM. It is possible for a CWM to have no subject area. For this reason, the operation of process 40 in block 402 is optional. Block 402 is used only when the CWM includes subject areas. Process 400 processes the ER domains included in the ER model (block 404). Process 400 processes domain inheritance for each of the ER domains (block 406), then processes ER entities included in the ER model (block 408). Process 400 processes the entity subtype relationships for each of the ER entities (block 410), and processes the non-subtype relationships for each of the ER relationships (block 412).

Figure 5:
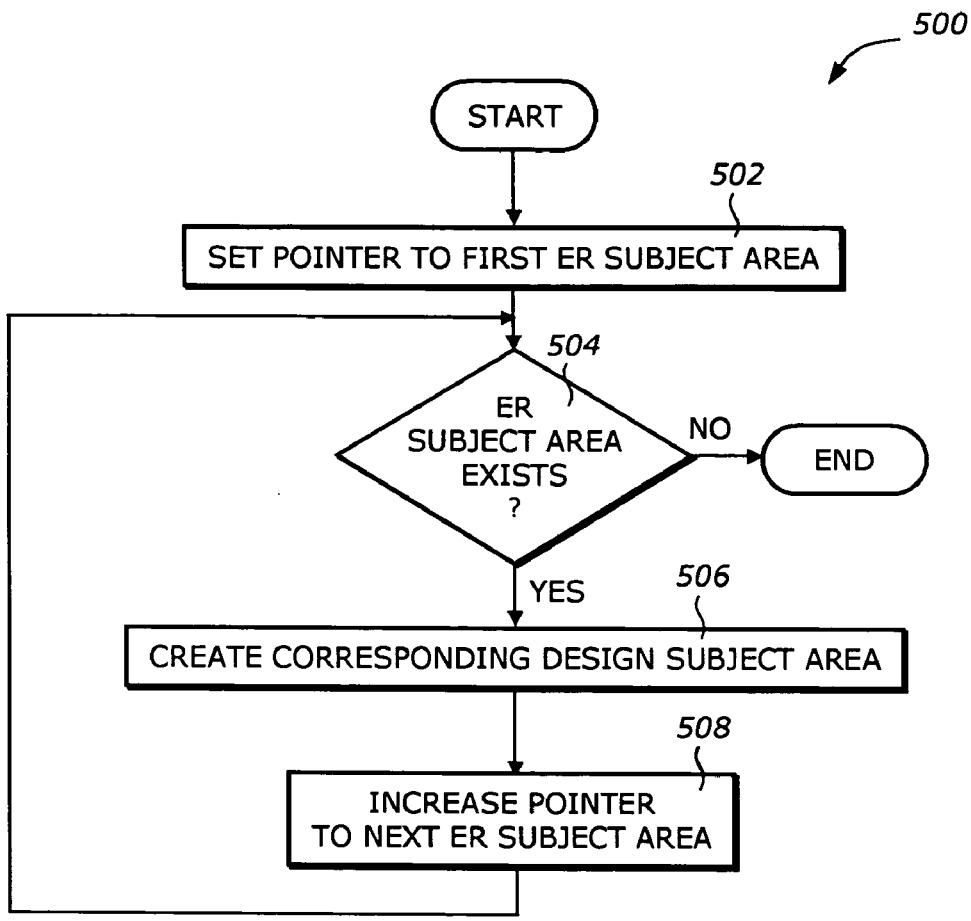
FIG. 5 is a flowchart illustrating the processing of the subject areas included in an ER model (block 402 of FIG. 4).

FIG. 5 is a flowchart illustrating the processing of the subject areas included in an ER model (block 402 of FIG. 4). Process 500 goes through the list of the ER subject areas and creates, for each ER subject area included in the ER model, a corresponding design subject area in the corresponding design model to represent that ER subject area.

Upon Start, process 500 sets a pointer to the first subject area in the ER model (block 502). Process 500 checks whether the ER subject area exists (block 504). If it does not exist, process 500 terminates. Otherwise, process 500 creates a corresponding design subject area to represent this ER subject area (block 506). The design subject area includes all the properties of the ER subject area. Process 500 increases the pointer to point to next subject area in the ER model (block 508) and goes back to block 504.

Figure 6:
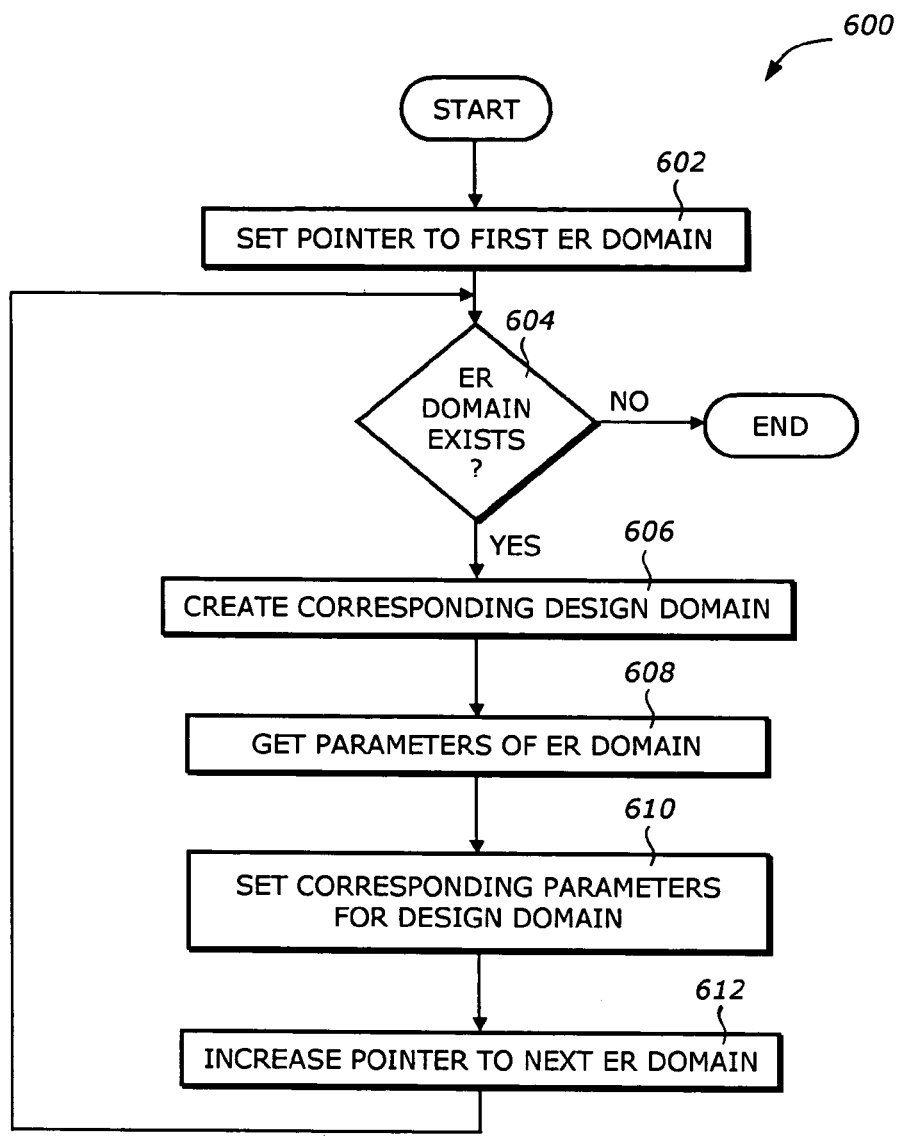
FIG. 6 is a flowchart illustrating the processing of the ER domains included in an ER model.

FIG. 6 is a flowchart illustrating the processing of the ER domains included in an ER model (block 404 of FIG. 4).

Upon Start, process 600 points to the first ER domain in the ER model (block 602). Process 600 checks whether this ER domain exists (block 604). If it does not exist, process 600 terminates. Otherwise, process 600 creates a corresponding design domain to represent this ER domain (block 606). Process 600 obtains the parameters for the ER domain, including the basetype, default and constraint (block 608). Process 600 uses this information to set the corresponding parameters for the design domain (block 610). Process 600 increases the pointer to the next ER domain (block 612) and goes back to block 604.

It is noted that, domains in general and particularly those related to textual base types are sometimes placed in a separate ER model. Other ER models would reference this separate ER model if needed information are to be found there. This is an example of the cross-model references that need to be resolved after all the ER libraries have been processed (see block 320 of FIG. 3).

Figure 7:
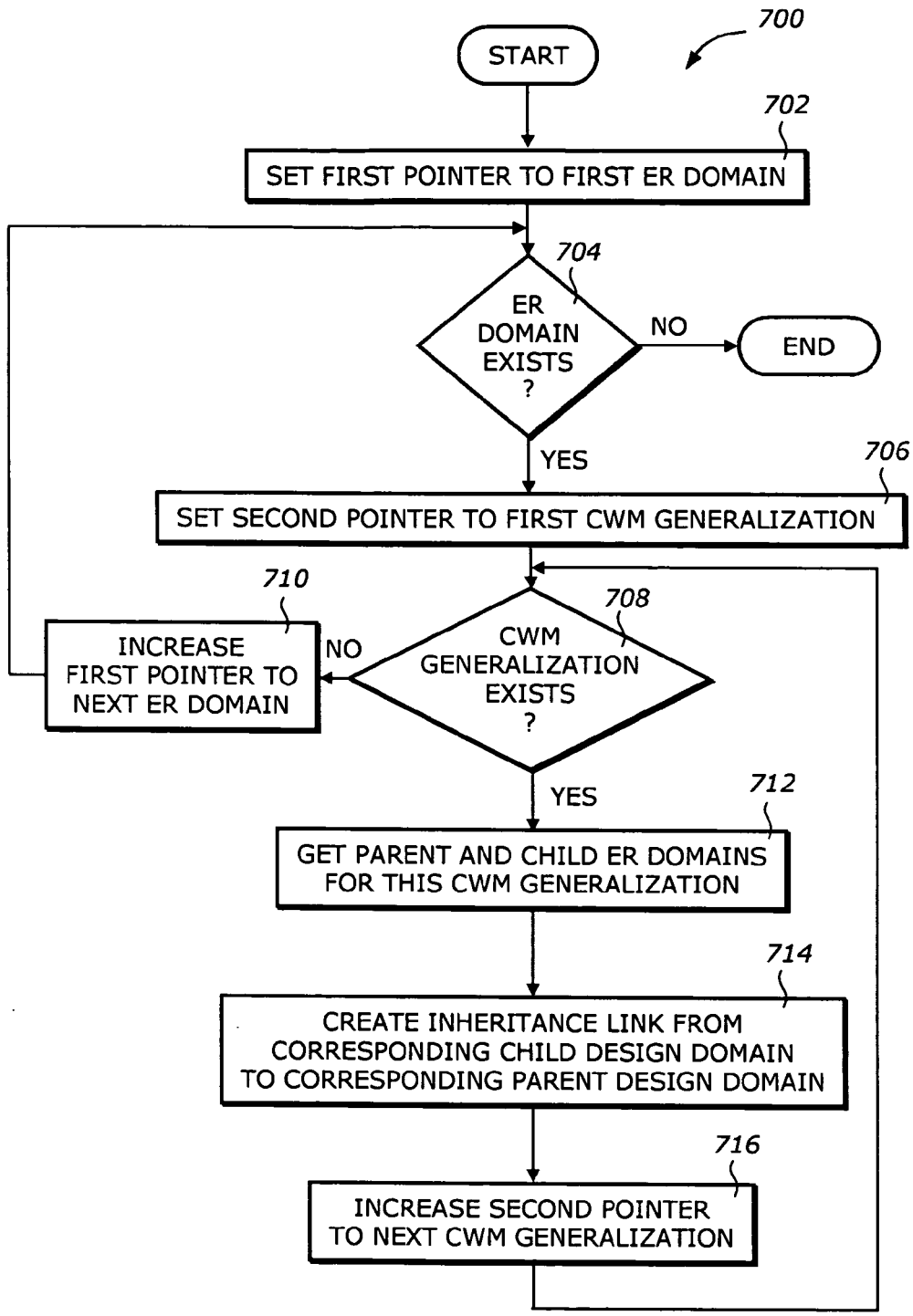
FIG. 7 is a flowchart illustrating the processing of the ER domain inheritance of each of the ER domains that are included in an ER model (block 406 of FIG. 4).

FIG. 7 is a flowchart illustrating the processing of the ER domain inheritance of each of the ER domains included in an ER model (block 406 of FIG. 4).

Upon Start, process 700 sets a first pointer to the first ER domain in the ER model (block 702). Process 700 checks whether the ER domain exists (block 704). If it does not exist, process 700 terminates. Otherwise, process 700 sets a second pointer to the first CWM generalization that links this ER domain (block 706). If there is no such generalization, process 700 increases the first pointer to point to the next ER domain (block 710) and goes back to block 704. If there is such CWM generalization, process 700 determines which are the parent and child ER domains for this CWM generalization, that is, the ends of the link of which the ER domain in question represents one end (block 712). The parent and child ER domains correspond to corresponding parent and child design domains in the relational database. To represent the generalization in the relational database, process 700 creates an inheritance link from the corresponding child design domain to the corresponding parent design domain (block 714). This inheritance link in the relational database corresponds to the inheritance link in the CWM. Process 700 increases the second pointer to point to the next CWM generalization that links this ER domain (block 716) and goes back to block 708.

Figure 8:
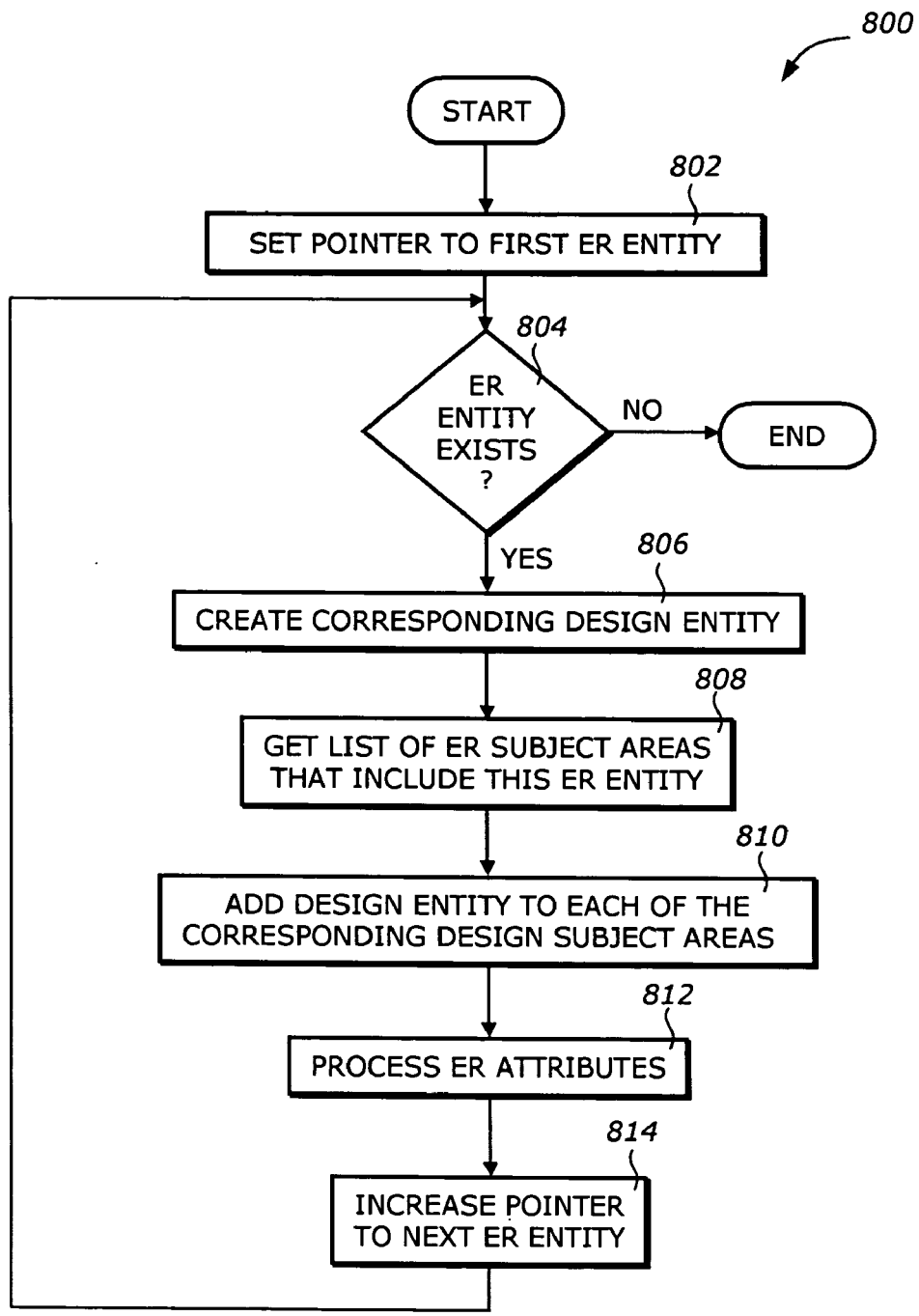
FIG. 8 is a flowchart illustrating the processing entities included in an ER model (block 408 of FIG. 4).

FIG. 8 is a flowchart illustrating the processing entities included in an ER model (block 408 of FIG. 4).

Figure 9:
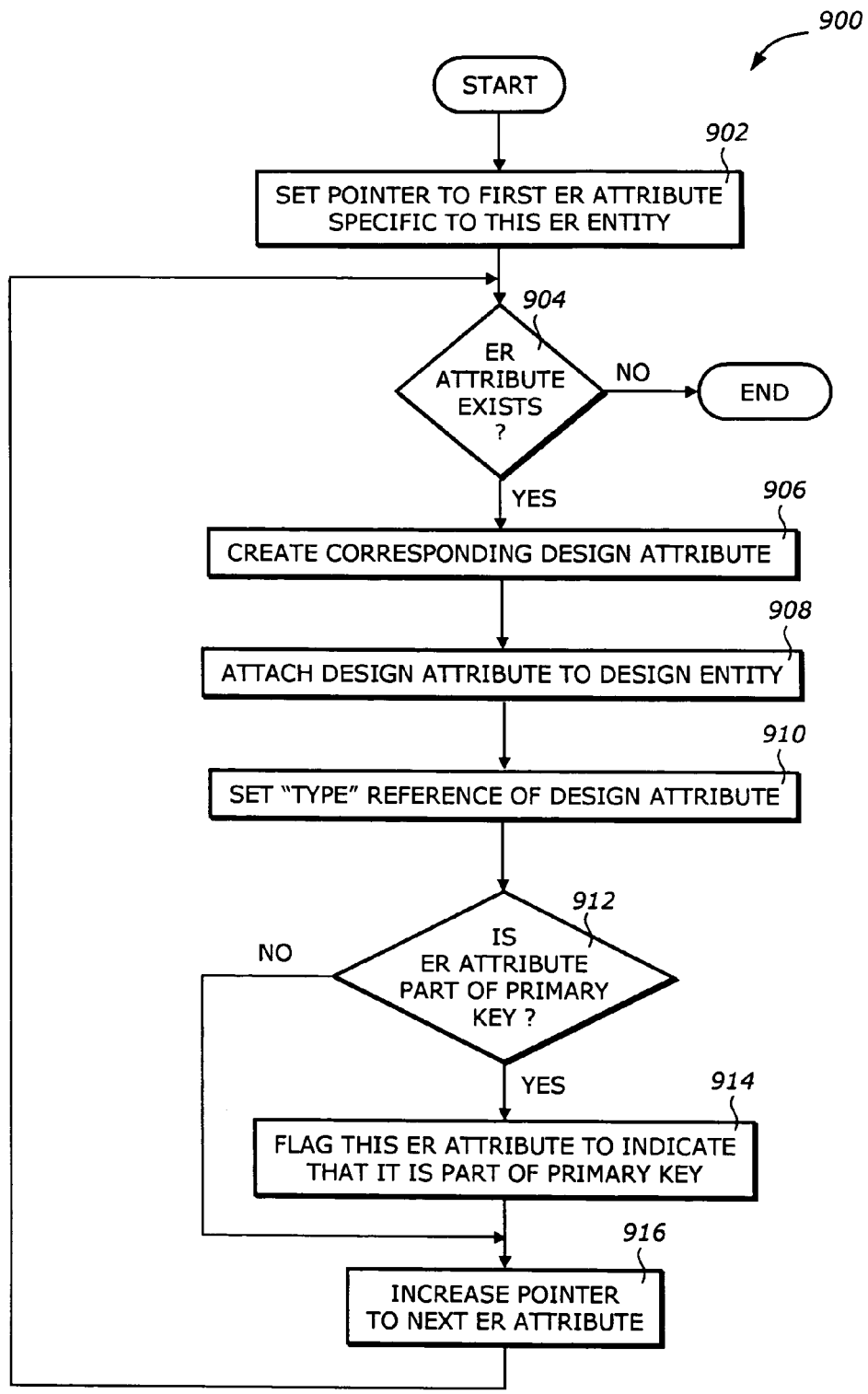
FIG. 9 is a flowchart illustrating the processing of the attributes associated with an ER entity (block 810 of FIG. 8).

Upon Start, process 800 sets a pointer to the first ER entity in the ER model (block 802). Process 800 checks whether there the ER entity exists (block 804). If it does not exist, process 800 terminates. Otherwise, process 800 creates for this ER entity a corresponding design entity in the design model that corresponds to the ER model (block 806). Process 800 obtains the list of all the ER subject areas that include this ER entity as a member (block 808). The ER subject areas have corresponding design subject areas in the relational database. Process 800 adds the corresponding design entity as a member of the corresponding design subject areas (block 810). Process 800 invokes process 900 to process the attributes associated with the ER entity (block 812). Process 900 is shown in FIG. 9 and will be described in detail later. Process 800 increases the pointer to point to the next ER entity (block 814) and goes back to block 804.

FIG. 9 is a flowchart illustrating the processing of the attributes associated with an ER entity (block 810 of FIG. 8).

Upon Start, process 900 sets a pointer to the first ER attribute specific to the ER entity (block 902). Process 900 checks whether the ER attribute exists (block 904). If it does not exist, process 900 terminates. Otherwise, process 900 creates a design attribute to represent the ER attribute (block 906). Process 900 attaches the design attribute to the design entity (block 908) that was created by process 800 (block 804 of FIG. 8) to correspond to this ER entity. Process 900 sets the "type" reference of the design attribute (block 910) based on the "type" reference of the ER attribute. Note that the "type" reference of the ER attribute links the ER attribute to an ER domain. This ER domain in the CWM has a corresponding design domain in the relational database. By setting the "type" reference of the design attribute, process 900 links the design attribute to this corresponding design domain. It is noted that the "type" reference can point to either one of the design domains previously created or a basic data type supported by the database design tool.

Process 900 determines whether the ER attribute is part of the ER primary key associated with the ER entity (block 912). If it is not part of the ER primary key, process 900 proceeds to block 916. If the ER attribute is part of the ER primary key, process 900 flags the design attribute as part of the design primary key associated with the design entity (block 914). Process 900 then increases the pointer to point to the next ER attribute (block 916) and goes back to block 904.

Figure 10:
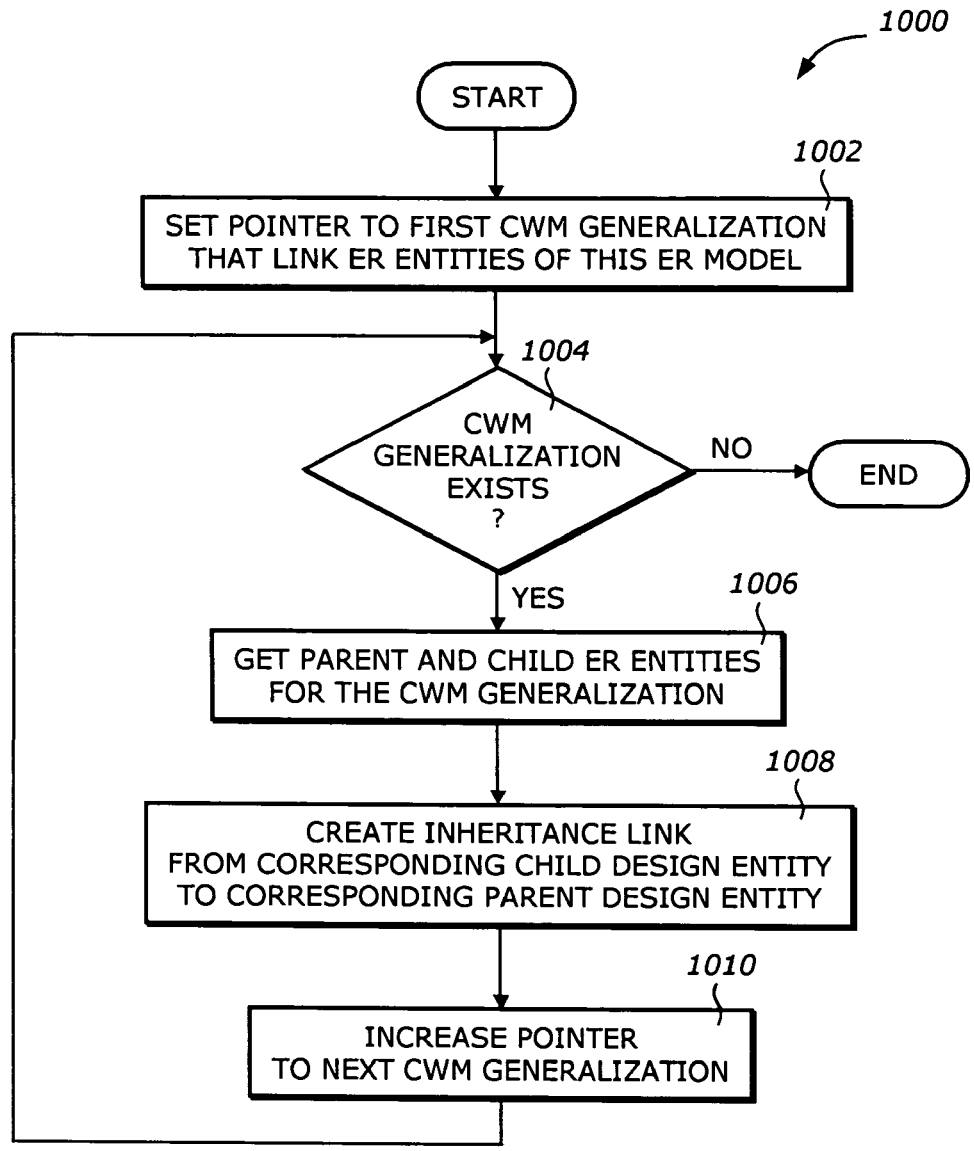
FIG. 10 is a flowchart illustrating the processing of the entity subtype relationships in an ER model (block 410 of FIG. 4).

FIG. 10 is a flowchart illustrating the processing of the entity subtype relationships for an ER entity included in an ER model (block 410 of FIG. 4).

Upon Start, process 1000 sets a pointer to the first CWM generalization that links the ER entities of this ER model (block 1002). Process 1000 determines whether the CWM generalization exists (block 1004). If it does not exist, process 1000 terminates. Otherwise, process 1000 determines which are the parent and child ER entities for this generalization (block 1006). The parent and child ER entities correspond to corresponding parent and child design entities in the relational database. To represent this generalization in the relational database, process 1000 creates an inheritance link from the corresponding child design entity to the corresponding parent design entity (block 1008). Process 1000 increases the pointer to point to the next CWM generalization (block 1010) and goes back to block 1004.

Figure 11A:
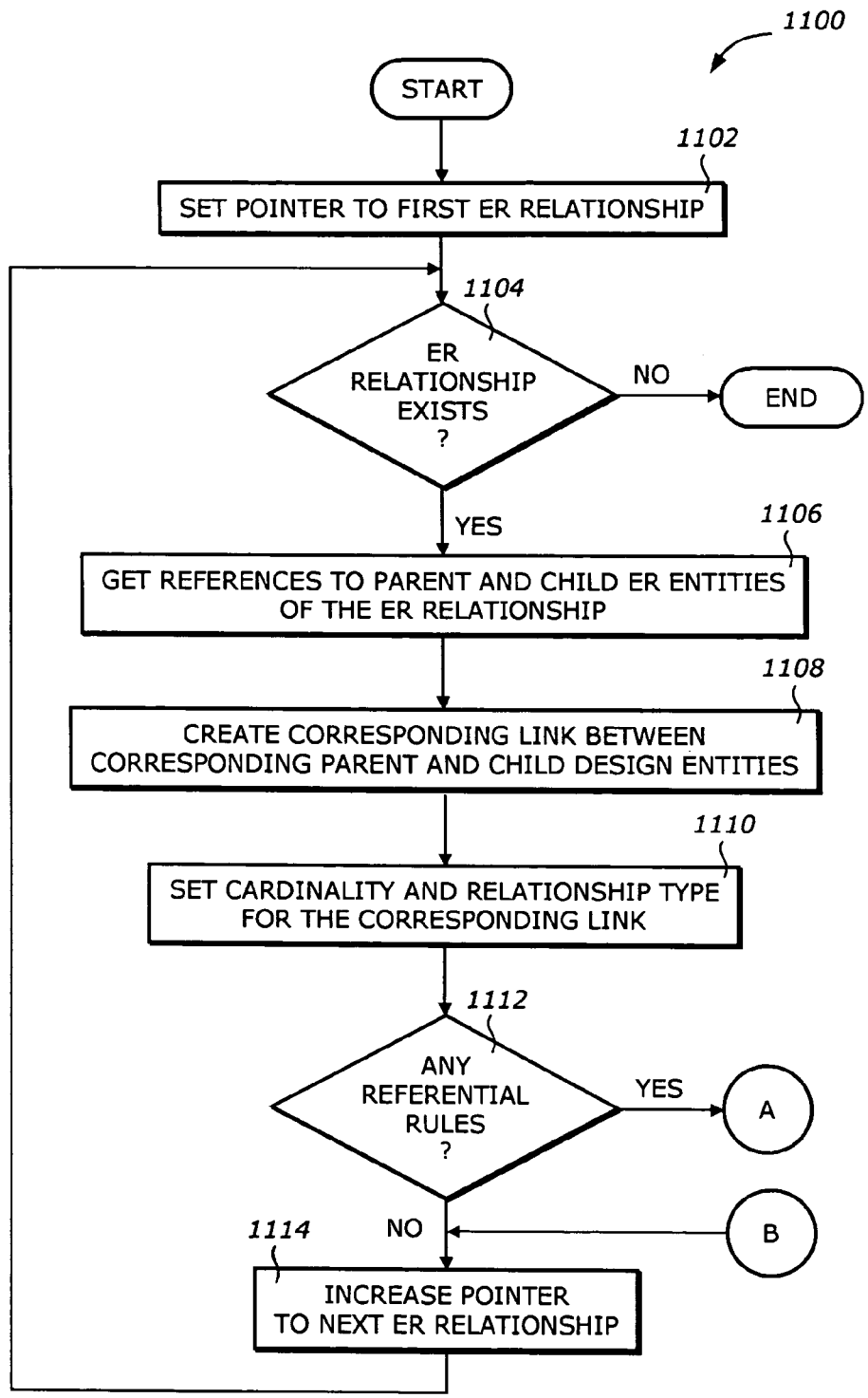
FIG. 11A and FIG. 11B is a flowchart illustrating the processing of the entity non-subtype relationships in an ER model (block 412 of FIG. 4).
Figure 11B:
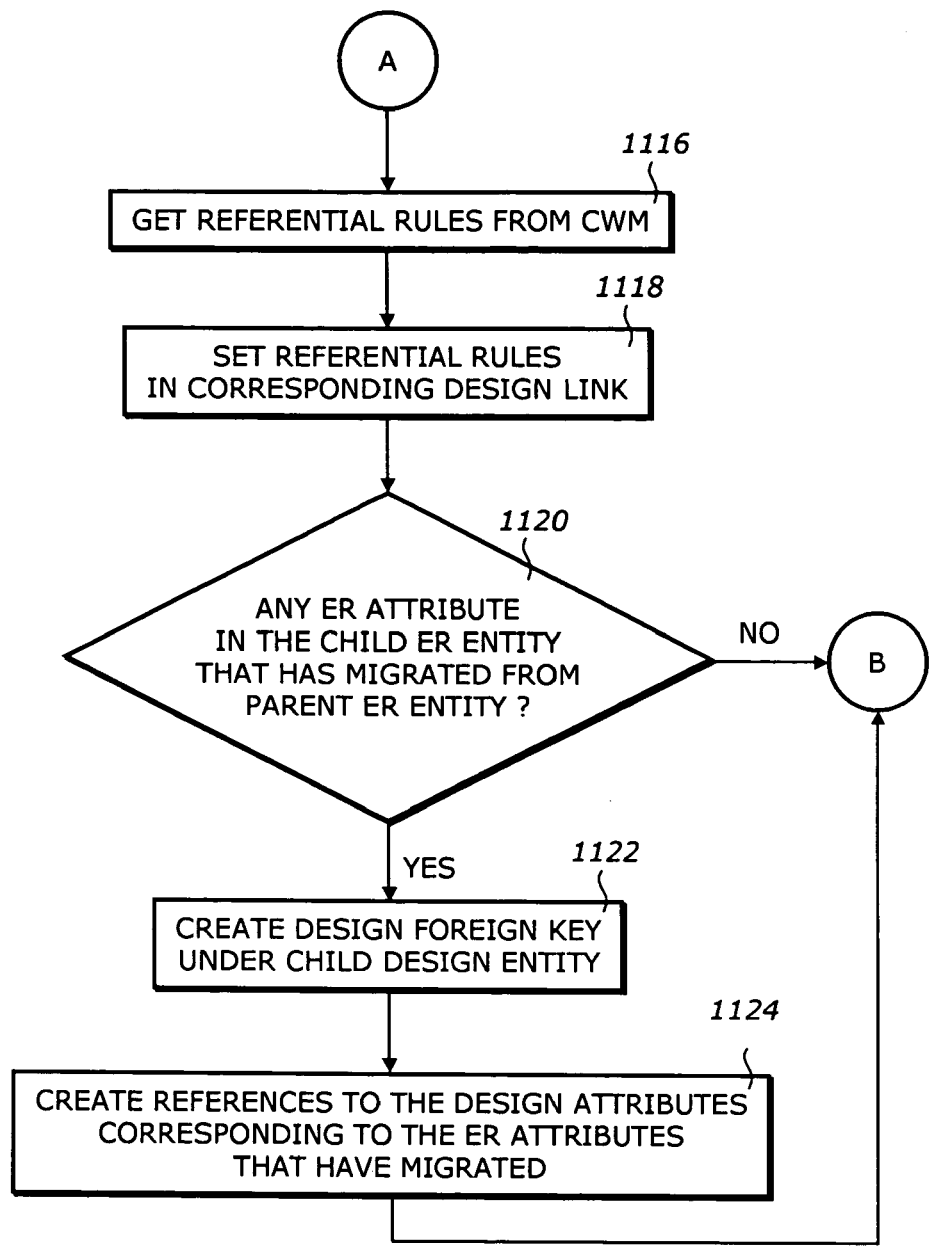

FIG. 11A and FIG. 11B are a flowchart illustrating the processing of the entity non-subtype relationships in an ER model (block 412 of FIG. 4).

Upon Start, process 1100 sets a pointer to the first ER relationship in the ER model (block 1102). Process 1100 checks whether the ER relationship exists (block 1104). If it does not exist, process 1100 terminates. Otherwise, process 1100 obtains the references to the parent and child ER entities for this ER entity non-subtype relationship (block 1106). The parent and child ER entities are represented by corresponding parent and child design entities in the relational database. To represent the ER non-subtype relationship in the relational database, process 1100 creates links between the corresponding child design entity (or entities) and the corresponding parent design entity or entities (block 1108). Due to the wide diversity in database design tools, this link could be established directly as a two-way link or by the creation of a design relationship to which each of the involved design entities is linked. Process 1100 sets the cardinality of the design relationship and sets the relationship type to "identifying" or "non-identifying" based on information stored as CWM "tagged elements" associated with the ER relationship (block 1110). The cardinality could be "1 to 1" or "* to 1" where * is an integer (can be zero). Process 1100 examines the ends of this ER relationship to determine whether this ER relationship has any referential rule (block 1112). Referential rules are also called integrity constraints. If there is no referential rule, process 1100 increases the pointer to point to the next ER relationship (block 1114) and goes back to block 1104. Otherwise, process 1100 proceeds to process the associated referential rule or rules (FIG. 11B).

Referring to FIG. 11B, process 1100 obtains the values of the referential rules including "Insert", "Update", and "Delete" from the CWM (block 1116), then sets the values of the corresponding referential rules for the design link (or design relationship) that corresponds to the ER relationship (block 1118). Process 1100 scans the child ER entity to determine whether any of the ER attributes of the child ER entity has migrated from the parent ER entity (block 1120). If there is none, process 1100 goes back to block 1114 (FIG. 11A) to process the next ER relationship. If there are ER attributes in the child ER entity that have migrated from the parent ER entity, then process 1100 creates a design foreign key under the child design entity (block 1122). It is noted that only one foreign key is created for all the attributes that have migrated from the parent entity to the child entity. Process 1100 creates references to the design attributes that correspond respectively to the ER attributes that have migrated (block 1124). Process 1100 then goes back to block 1114 (FIG. 11A) to process the next ER relationship. It is noted that all of the ER items identified above may have their own diagram and annotated text information attached to them. In such case, these diagrams and annotated text information are also stored for the corresponding design items.

The physical aspects of the CWM are processed differently than the logical aspects of the CWM. Instead of creating the corresponding elements in the output (DBMS) on the fly while simultaneously processing the CWM input, more of the CWM information is processed first before creating the output elements. The main reason for this is the "object-oriented" nature of CWM as opposed to the "sequential, script-like" process typically involved in working with a DBMS.

Data types are processed first, followed by the relational tables, views, indexes, triggers, and procedures. This is due to the fact that the columns in the latter elements have references to the data types.

Figure 12:
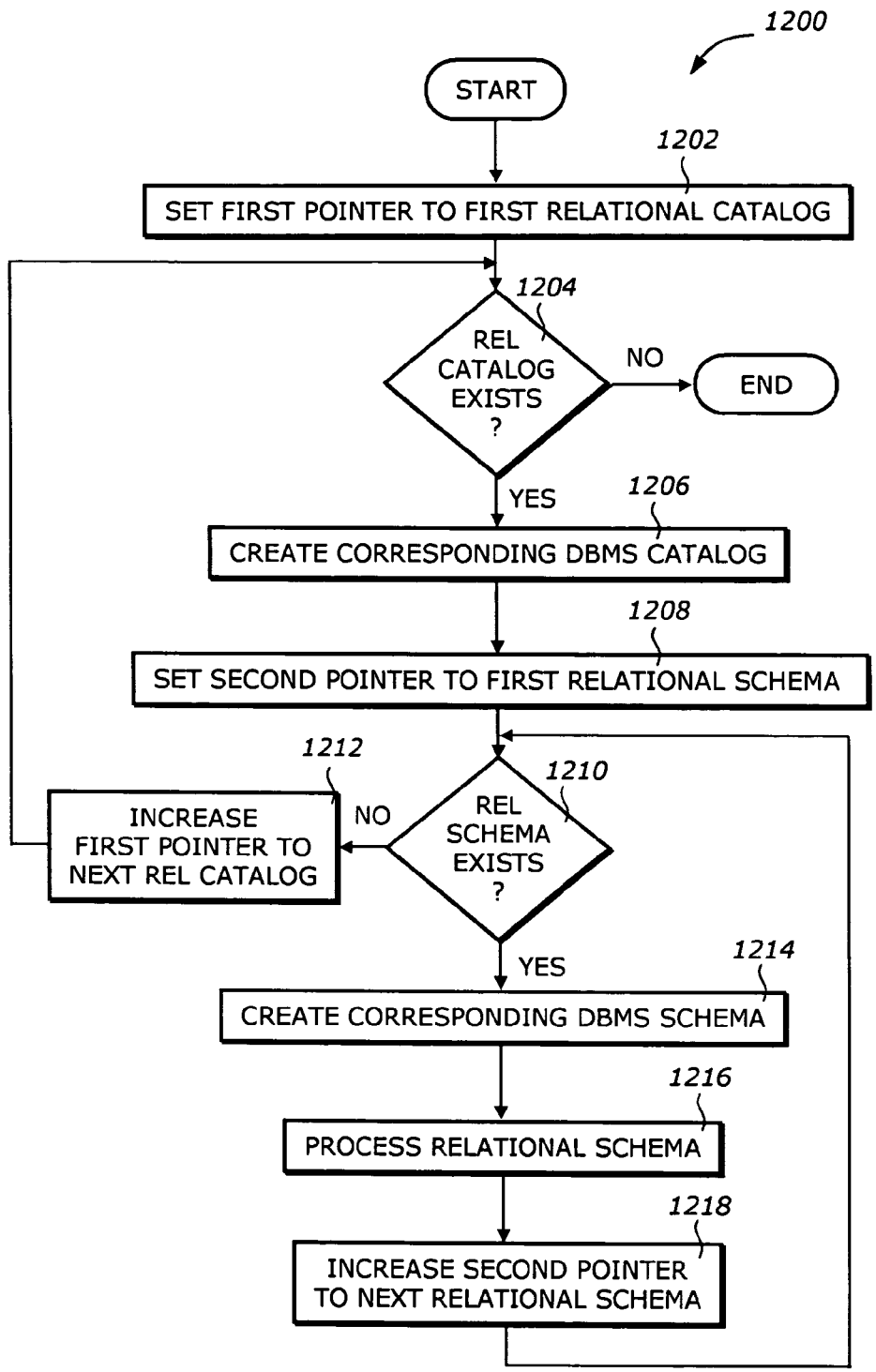
FIG. 12 is a flowchart illustrating the process 1300 of converting the physical aspects of a common warehouse model (CWM) to corresponding database management system (DBMS) representation in a relational database.

FIG. 12 is a flowchart illustrating the process 1200 of converting the physical aspects of a common warehouse model (CWM) to corresponding database management system (DBMS) representation in a relational database. The physical aspects of the CWM comprise relational catalogs. Each of the relational catalogs comprises relational schemas. The corresponding DBMS representation comprises DBMS catalogs. Each of the DBMS catalogs comprises DBMS schemas. Process 1200 can output the DBMS representation to a DBMS. This output is typically in the form of a script containing instructions to modify existing or create new elements in the relational database. For example, the script used in Structured Query Language (SQL) could be the form of this output.

Process 1200 scans through the relational catalogs. For each of the relational catalogs, that is being scanned, process 1200 creates a corresponding DBMS catalog to be outputted to the DBMS. For each of the relational schemas in each of the relational catalogs, process 1200 creates a corresponding DBMS schema in the corresponding DBMS catalog to hold the corresponding information. Process 1200 processes each of the relational schemas to produce the corresponding information for the corresponding DBMS schema. Process 1200 processes each of the relational schemas in the CWM independently of the other relational schemas. Detailed description of process 1200 is as follows.

Upon Start, process 1200 sets a first pointer to the first relational catalog (block 1202). Process 1200 checks whether this relational catalog exists (block 1204). If it does not exist, process 1200 terminates. Otherwise, process 1200 creates a corresponding DBMS catalog (1206). Process 1200 sets a second pointer to the first relational schema in the relational catalog (block 1208). Process 1200 checks whether this relational schema exists (block 1210). If it does not exist, process 1200 increases the first pointer to point to the next relational catalog (block 1212) and goes back to block 1204. If the relational schema exists, process 1200 creates a corresponding DBMS schema (block 1214). Process 1200 processes the relational schema (block 1216). This processing of the relational schema is described in detail later in connection with FIG. 13 through FIG. 24. Process 1200 then increases the second pointer to point to the next relational schema (block 1218) and goes back to block 1210.

Figure 13:
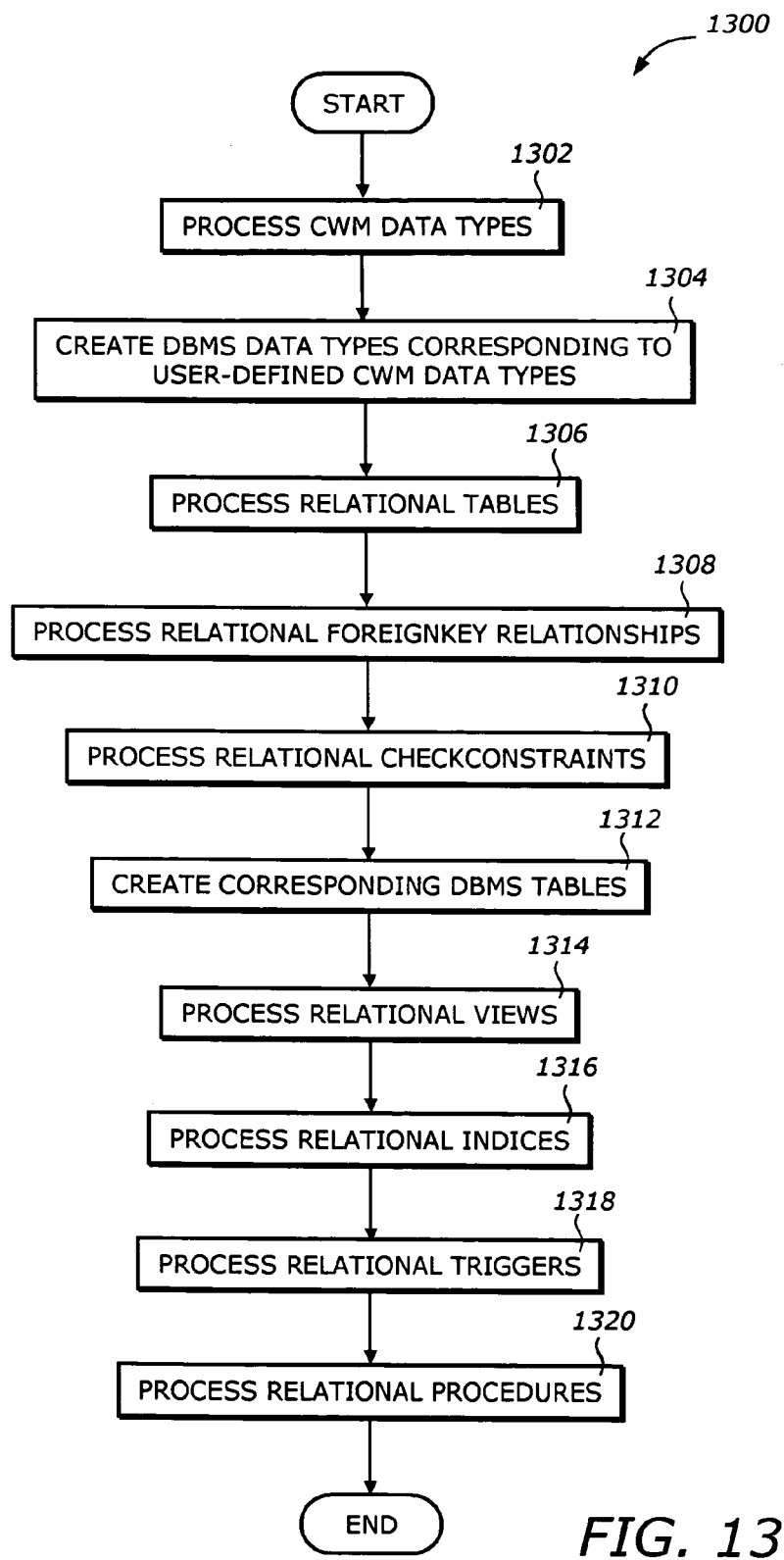
FIG. 13 is a flowchart of an embodiment 1300 of block 1216 of FIG. 12, illustrating the processing of a relational schema in the CWM to produce a corresponding DBMS schema for the relational database.

FIG. 13 is a flowchart of an embodiment 1300 of block 1216 of FIG. 12, illustrating the processing of a relational schema in the CWM to produce a corresponding DBMS schema for the relational database.

Upon Start, process 1300 processes CWM data types included in the CWM (block 1302). Process 1300 creates DBMS data types corresponding to the CWM data types (block 1304). Process 1300 processes relational tables included in the relational schema (block 1306). Process 1300 processes relational foreign key relationships for each of the relational tables (block 1308). Process 1300 processes the checkconstraints for the relational schema (block 1310). Process 1300 creates the DBMS tables corresponding to the relational tables (block 1312). Process 1300 processes the relational views for the relational schema (block 1314). Process 1300 processes the relational indices for the relational schema (block 1316). Process 1300 processes the relational triggers for the relational schema (block 1318). Process 1300 processes the relational procedures for the relational schema (1320). Process 1300 then terminates.

Figure 14:
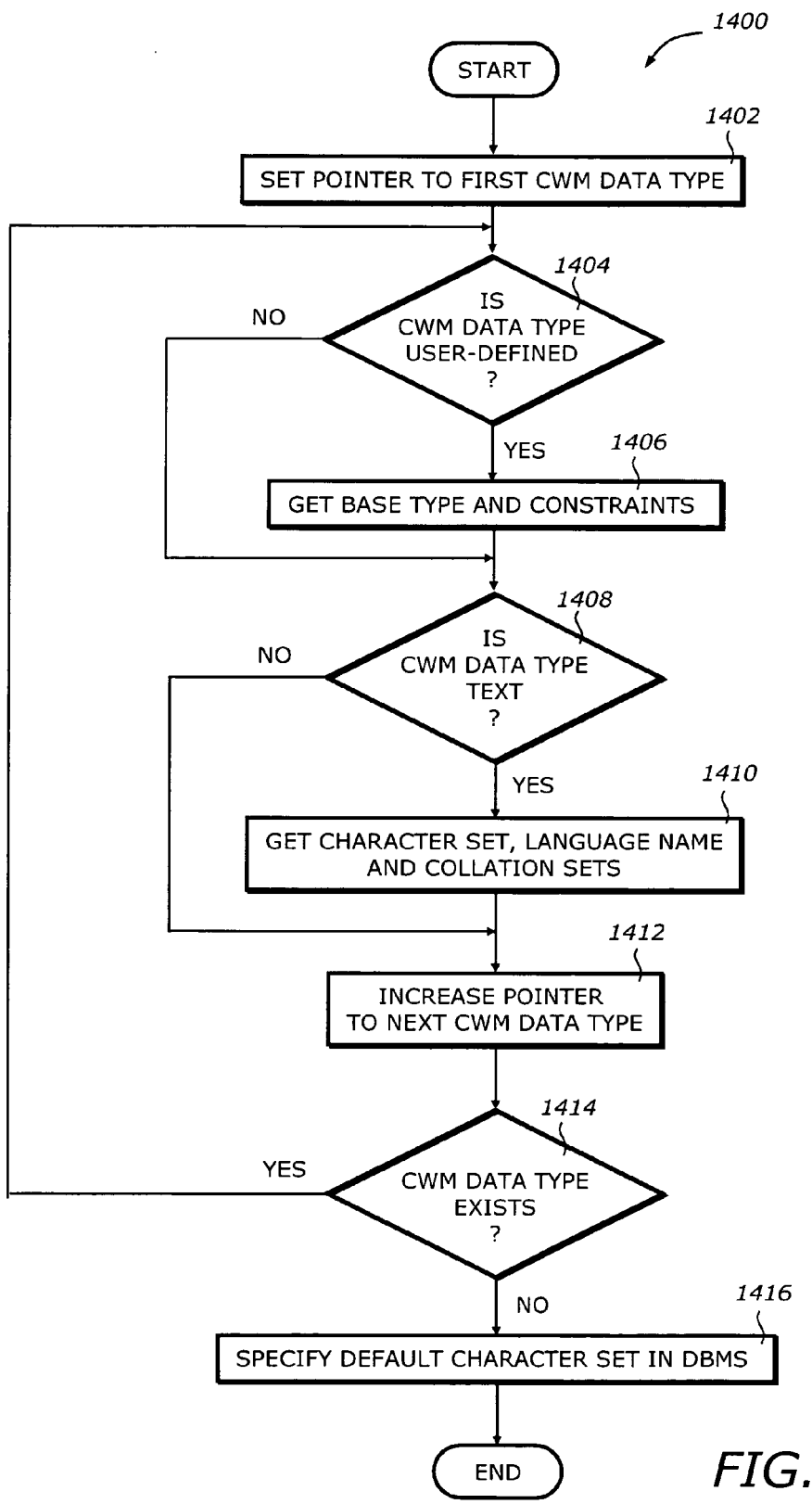
FIG. 14 is a flowchart of an embodiment 1400 of block 1302 of FIG. 13, illustrating the processing of the data types in the CWM to produce the corresponding DBMS data types for the relational database.

FIG. 14 is a flowchart of an embodiment 1400 of block 1302 of FIG. 13, illustrating the processing of the data types in the CWM to produce the corresponding DBMS data types for the relational database. Process 1400 enumerates all CWM data types so that these CWM data types can be represented by the DBMS data types.

Upon Start, process 1400 sets pointer to the first CWM data type (block 1402). Process 1400 determines whether the CWM data type is a default data type, i.e., matches with a DBMS-provided data type, or a user-defined data type (block 1404). A user-defined data type has a base type (which should match one of the default DBMS-provided data types) and at least one rule or constraint. If the CWM data type is user-defined, process 1400 obtains the base type and the constraint(s) (block 1406). A constraint is also called a rule. A data type can be dates, numbers, text, or Boolean. Process 1400 checks whether the CWM data type is text (block 1408). If it is not, process 1400 proceeds to block 1412. Otherwise, process 1400 obtains the character set, name of language and collation sets associated with the CWM data type (block 1410). The name of language and the collation sets together define textual characteristics and sorting order. Process 1400 then increases the pointer (block 1412). Process 1400 determines if there is another CWM data type from the list of data types to be processed (block 1414). If there is, process 1400 loops back to block 1404. Otherwise, process 1400 specifies the default character set for the DBMS output (block 1416) then terminates.

It is noted that it is usually not possible to add character sets to a DBMS. If the DBMS supported character sets are more limited than what is required, the default character set or a closely related character set will be used instead.

Figure 15:
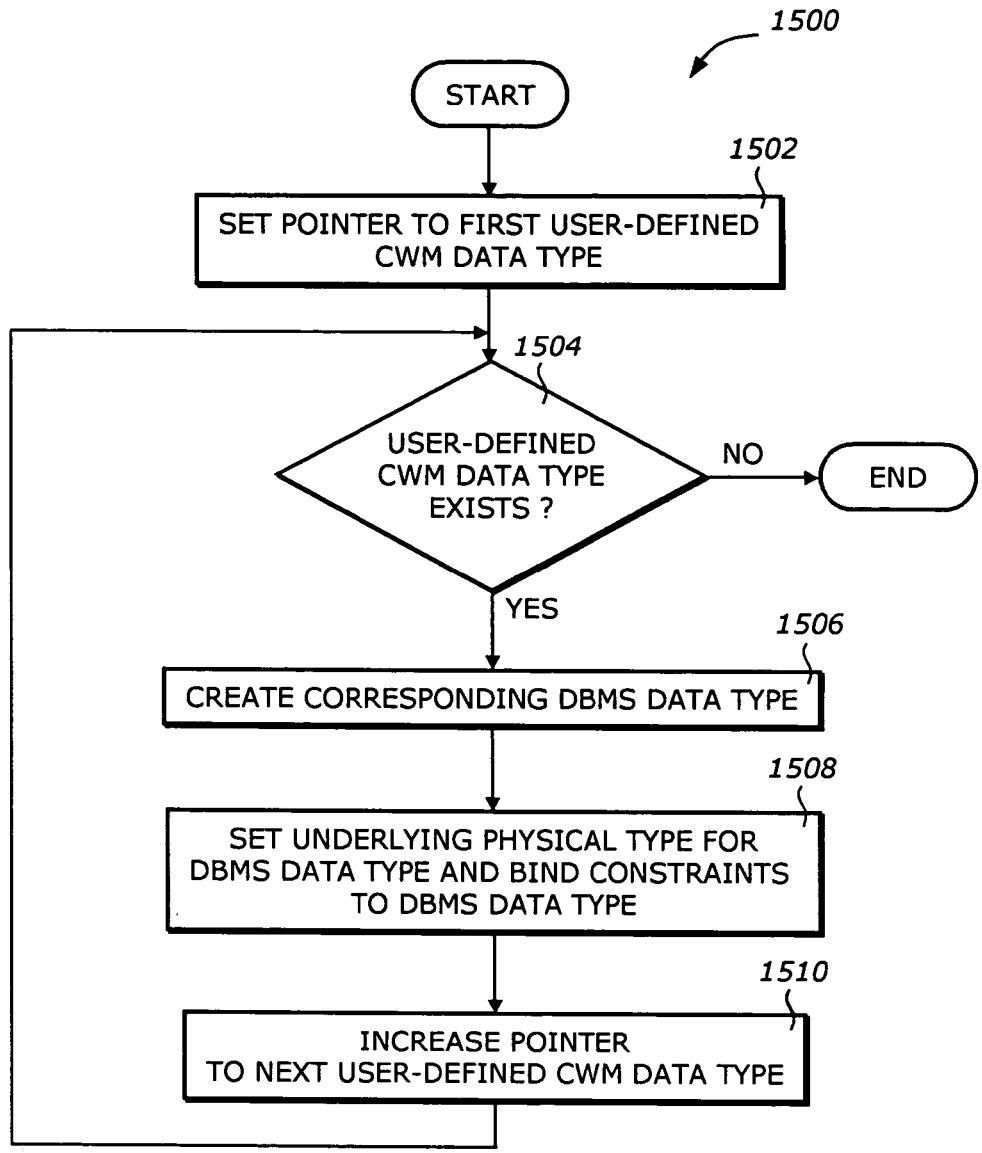
FIG. 15 is a flowchart of an embodiment 1500 of the process of creating DBMS data types corresponding to the user-defined CWM data types.

FIG. 15 is a flowchart of an embodiment 1500 of the process of creating DBMS data types corresponding to the user-defined CWM data types. Process 1500 sets pointer to the first element of the list of the user-defined CWM data types (block 1502) and determines whether there is a user-defined CWM data type (block 1504). If there is none, process 1500 terminates. If there is, then process 1500 creates a corresponding DBMS data type in the corresponding DBMS schema (block 1506). Process 1500 sets the underlying physical type for the DBMS data type, based on the previously obtained base type of the CWM data type (block 1406 of FIG. 14) and binds a constraint or constraints to the DBMS data type (block 1508), based on the previously obtained constraint or constraints of the CWM data type (block 1406 of FIG. 14). It is noted that, if the output recipient, i.e., the DBMS, does not provide this capability of binding a constraint to a data type, then the constraint will have to be added to every DBMS column that uses this data type. Process 1500 increases the pointer (block 1510), and goes back to block 1504.

Figure 16:
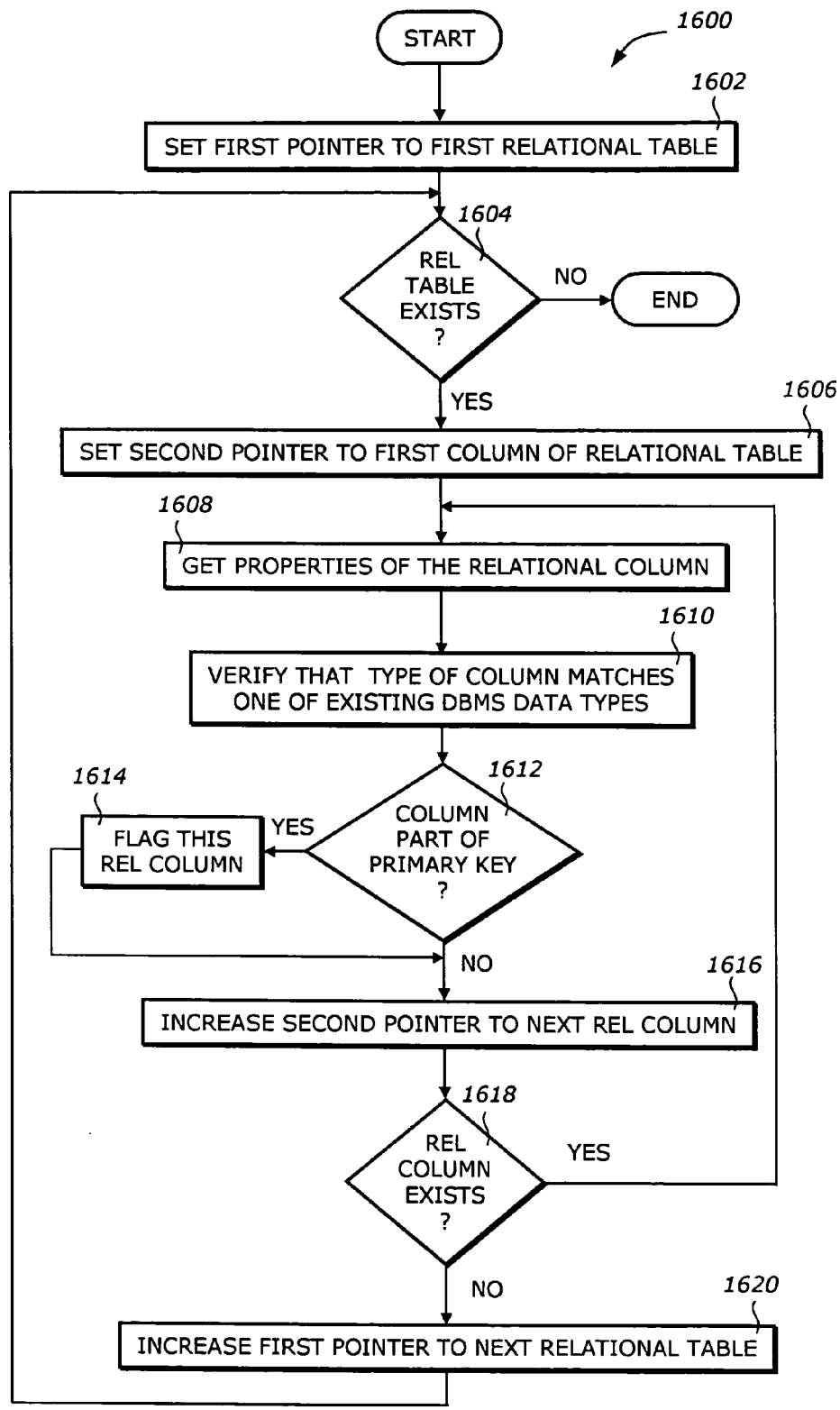
FIG. 16 is a flowchart of an embodiment 1600 of the process of processing relational tables included in a relational schema.

FIG. 16 is a flowchart of an embodiment 1600 of the process of processing relational tables included in a relational schema.

Upon Start, process 1600 sets a first pointer to the first element of the list of relational tables in the relational schema being considered (block 1602). Process 1600 determines whether the relational table exists (block 1604). If it does not exist, process 1600 terminates. Otherwise, process 1600 sets a second pointer to the first column of this relational table (block 1606). Process 1600 obtains the properties of the column (block 1608). These properties include the type, precision, scale, length, IsNullable, CollationName, and CharacterisetName. Process 1600 verifies that the type of this column matches one of the existing DBMS data types (block 1610) which include the default DBMS-provided data types and the user-defined DBMS data types previously created by process 1500 (FIG. 15). Note that, if the type of this column does not match an existing DBMS data types, process 1600 would flag an error. The relational table has a relational primary key. Process 1600 determines whether this relational column is part of the relational primary key (block 1612). If it is not, process 1600 proceeds to block 1616. If the relational column is part of the relational primary key, process 1600 flags this column to so indicate (1614). Process 1600 then increases the second pointer (block 1616) and checks whether such column exists (block 1618). If the column exists, process 1600 goes back to block 1608 and proceeds as previously described. Otherwise, process 1600 increases the first pointer to point to the next relational table (block 1620) and goes back to block 1604 to process this next relational table.

Figure 17:
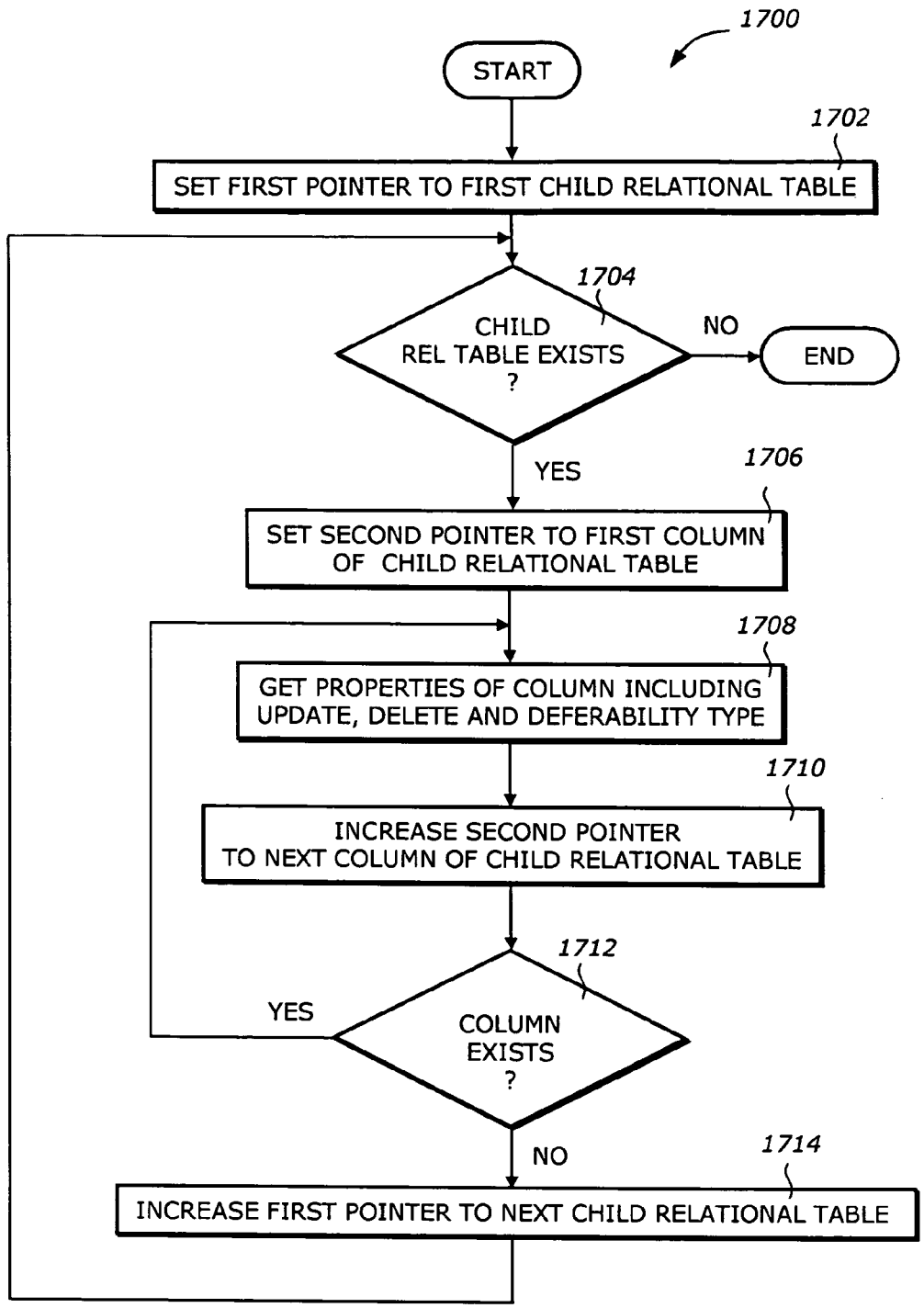
FIG. 17 is a flowchart of an embodiment 1700 of the process of processing relational foreign key relationships of a relational table.

FIG. 17 is a flowchart of an embodiment 1700 of the process of processing relational foreign key relationships of a relational table. Process 1700 is executed for each of the relational tables. Process 1700 enumerates all the relational tables that have foreign key relationships with the relational table being considered. The relational table being considered is referred to as the "parent" relational table, and the relational tables with which the parent relational table has foreign key relationships are referred to as "child" relational tables. While enumerating the child relational tables, for each of the child relational tables, i.e., for each of these foreign key relationships, process 1700 enumerates all the relational columns imported from the respective child relational table to the parent relational table. While enumerating the relational columns, process 1700 obtains the properties of each of the columns being enumerated, including "update" and "delete" referential integrity rules and deferability type. Detailed description of process 1700 is as follows.

Upon Start, process 1700 sets a first pointer to the first element in the list of the child relational tables (block 1702). Process 1700 determines whether this is a child relational table (block 1704). If it is not, process 1700 terminates. Otherwise, process 1700 sets a second pointer to the first column of the child relational table (block 1706). Process 1700 obtains the properties of this relational column, including the "update" and "delete" referential integrity rules and deferability type (block 1708). Process 1700 increases the second pointer to point at the next column (block 1710). Process 1700 checks whether this column exists (block 1712). If the column exists, process 1700 goes back to block 1708 and proceeds as previously described. Otherwise, process 1700 increases the first pointer to point to the next child relational table (block 1714) and goes back to block 1704 to process the next foreign key relationship, that is, the next child relational table.

Figure 18:
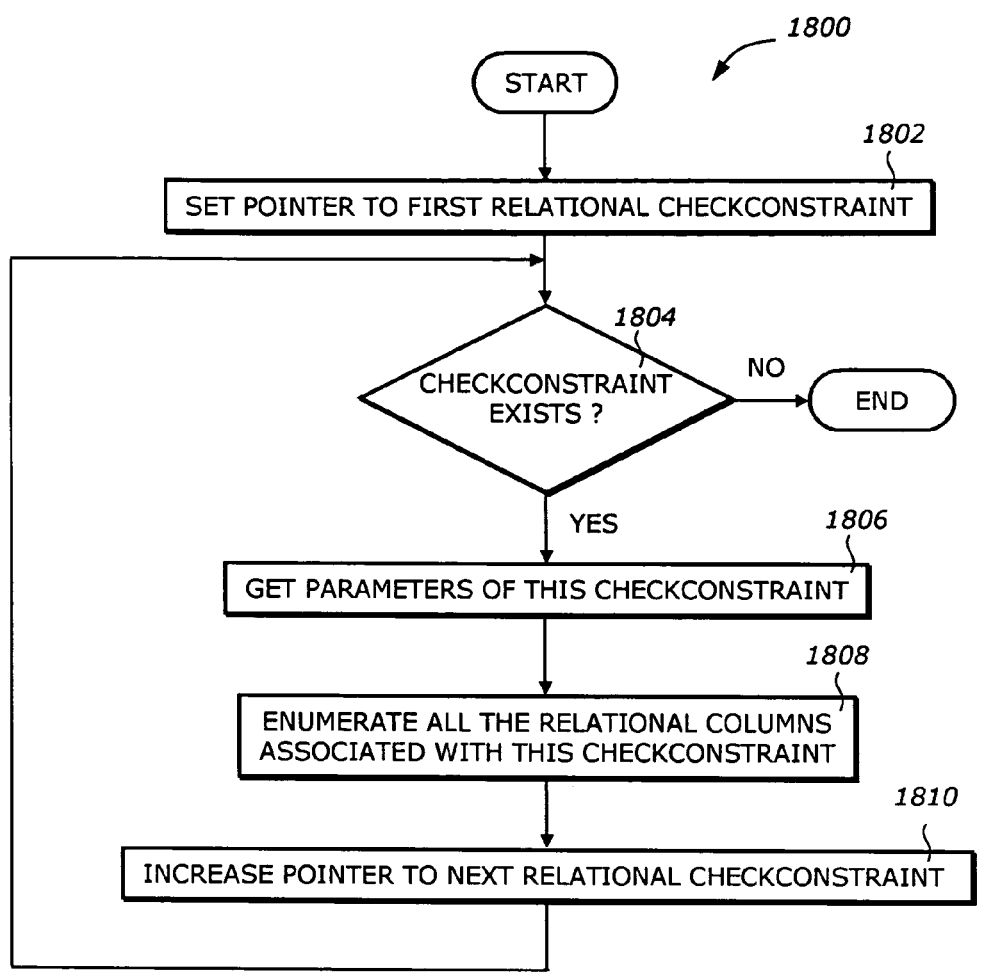
FIG. 18 is a flowchart of an embodiment 1800 of the process of processing relational checkconstraints for a relational schema.

FIG. 18 is a flowchart of an embodiment 1800 of the process of processing relational checkconstraints for a relational schema. Process 1800 is executed for each of the relational schemas. Process 1800 enumerates all relational checkconstraints associated with the relational schema being considered. While enumerating a relational checkconstraint, process 1800 obtains the parameters that describe this relational checkconstraint and enumerates all relational columns that have references to this relational checkconstraint. Detailed description of process 1800 is as follows.

Upon Start, process 1800 sets pointer to the first element of the list of relational checkconstraints (block 1802). Process 1800 checks whether the checkconstraint exists (block 1804). If there is no checkconstraint, process 1800 terminates. Otherwise, process 1800 obtains the parameters that describe and are associated with this checkconstraint (block 1806). Process 1800 enumerates all the relational columns that have constrained element references to this checkconstraint (block 1808). These are the relational columns that are operated on by this checkconstraint. The checkconstraint has pointers to the relational columns that it affects. Process 1800 increases the pointer to the next element in the list of relational checkconstraints (block 1810) and goes back to block 1804.

Figure 19A:
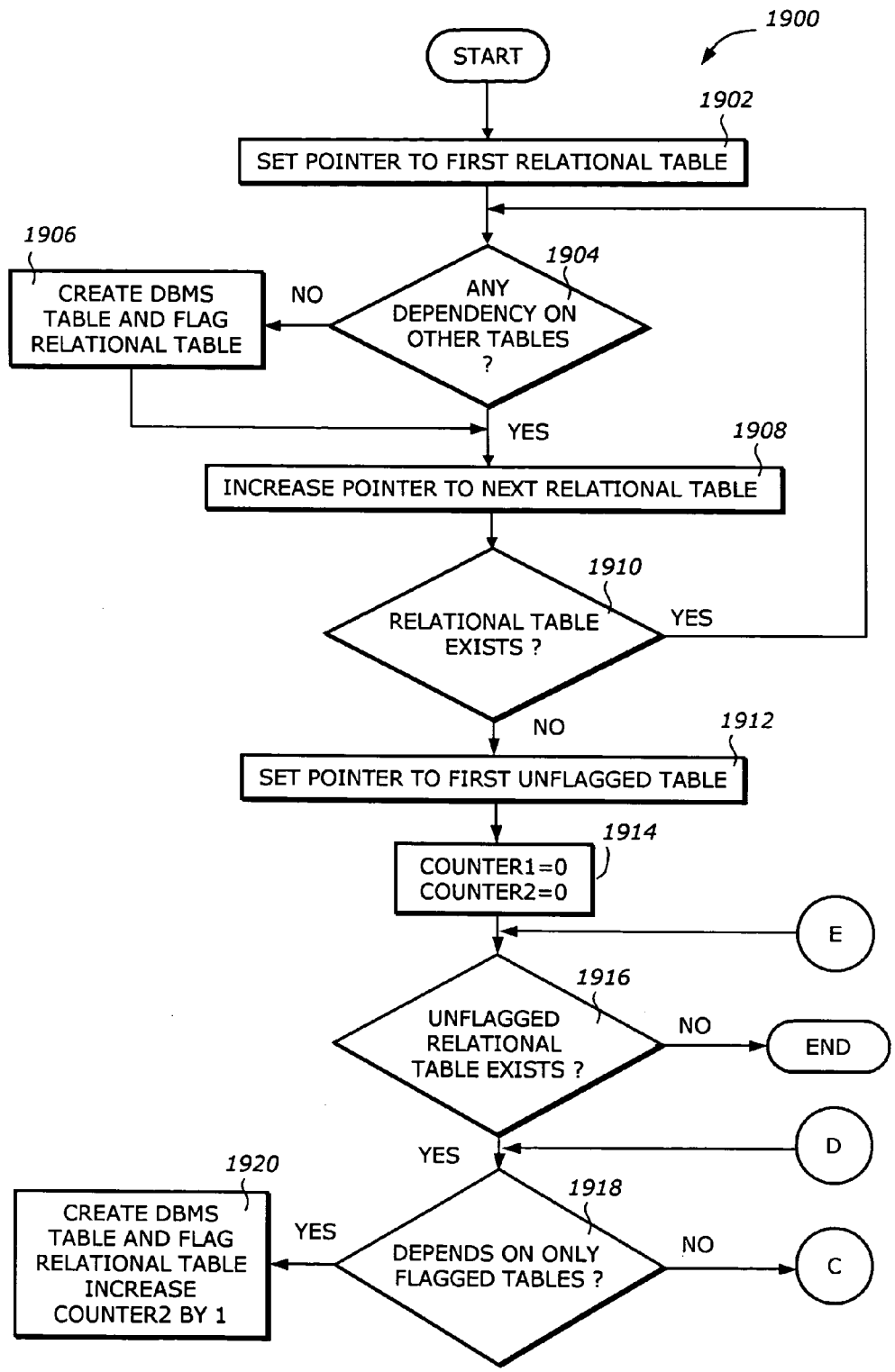
FIG. 19A and FIG. 19B are a flowchart of an embodiment 1900 of the process of creating DBMS tables that represent the relational tables included in a relational schema.
Figure 19B:
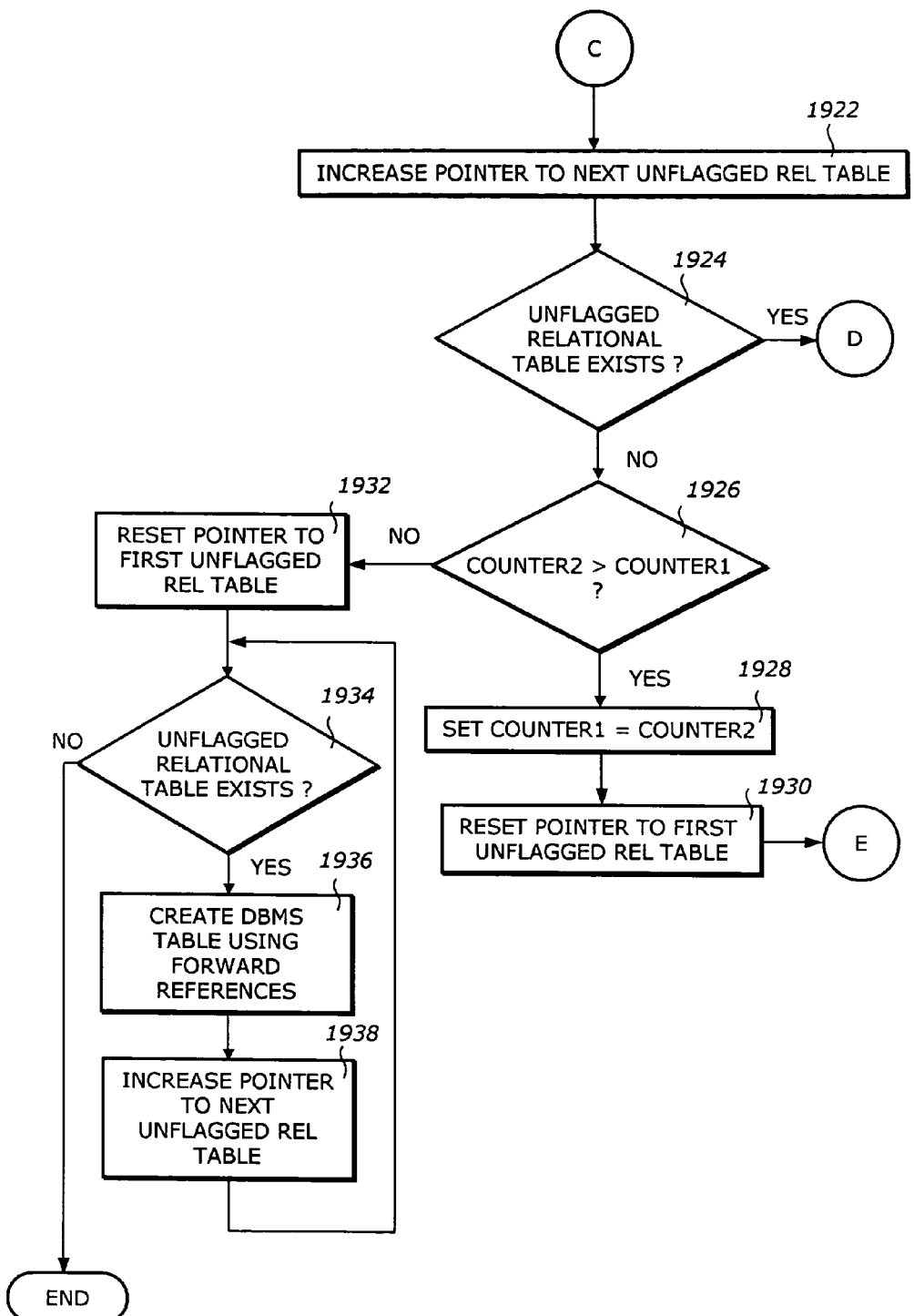

FIG. 19A and FIG. 19B are a flowchart of an embodiment 1900 of the process of creating DBMS tables that represent the relational tables included in a relational schema. The foreign key relationships identified previously (FIG. 17) represent dependencies between the relational tables in a relational schema. In general, when outputting to a script language, it is desirable to have the definition of a DBMS table preceded by the DBMS tables that this DBMS table depends on. To achieve that, process 1900 first selects the relational tables that have no dependency on any other relational tables and output these selected relational tables as DBMS tables. Next, process 1900 iterates through the remaining relational tables, selects and outputs one at a time the relational tables that depend only on at least one of the previously selected (and outputted) tables. This step is repeated until an iteration is completed without any DBMS table being created. This means that, at this point, there is no relational table left that depends only on at least one of the previously selected (and outputted) tables. If there are any remaining relational tables that have not been selected, process 1900 outputs each of these remaining relational tables using forward references. Note that, if there are any relational tables left that have not been selected, it is because they are mutually dependent. Assuming that the output DBMS language supports forward references, a DBMS table can be created for each of these mutually dependent relational tables. By "forward references" it is meant that a DBMS table in the process of being created is defined in terms of dependencies on DBMS tables that have not yet been created. Another technique for creating DBMS tables for the mutually dependent relational tables is to partially define the DBMS tables and then use ALTER TABLE commands to modify the partially defined DBMS tables. If the output DBMS language does not support forward references or ALTER TABLE commands, then the physical aspects of the CWM cannot be transformed successfully to this DBMS.

Upon Start, process 1900 set the pointer to the first relational table of the list of relational tables of the relational schema (block 1902). Process 1900 checks whether this relational table has any dependency on any other tables in the list (block 1904). If it has, process 1900 proceeds to block 1908. If it has no dependency on other relational tables, process 1900 creates a corresponding DBMS table and flags this relational table to indicate that it has been selected (block 1906) and proceeds to block 1908. Process 1900 increases the pointer to point to the next element in the list of relational tables (block 1908). Process 1900 checks whether this relational table exists (block 1910). If it exists, meaning the end of the list has not been reached, process 1900 goes back to block 1904. If it does not exist, process 1900 sets the pointer to the first unflagged relational table (block 1912). Process 1900 initializes counter1 and counter2 to zero (block 1914). Process 1900 checks whether the unflagged relational table exists (block 1916). If it does not exist, process 1900 terminates.

If the unflagged relational table exists, process 1900 creates a corresponding DBMS table, flags this previously unflagged relational table, and increases counter2 by 1 (block 1920). Counter2 is used to keep count of the number of DBMS tables created during this phase of process 1900. Process 1900 increases the pointer to point to the next unflagged relational table (block 1922). Process 1900 checks whether this unflagged relational table exists (block 1924). If it does exists, process 1900 goes back to block 1918. If it does not exists, this means the first iteration through the list of relational tables is complete. Process 1900 checks whether counter2 is strictly greater than counter1 (block 1926). If counter2 is strictly greater than counter1, this means that there were DBMS tables created during the iteration. In this case, process 1900 sets counter1 equal to counter2, so that a comparison can be made for the next iteration (block 1928). Process 1900 resets the pointer to the first unflagged relational table (block 1930), and goes back to block 1916.

If counter2 is not strictly greater than counter1, this means that no DBMS table was created during the iteration. This means that there is no relational table left in the list that depends only on at least one of the previously flagged tables. Process 1900 resets the pointer to the first unflagged relational table (block 1932). Process 1900 checks whether this unflagged relational table exists (block 1934). If it does not exist, process 1900 terminates. Otherwise, process 1900 creates a corresponding DBMS table using forward references (block 1936). Process 1900 increases the pointer to the next unflagged relational table (block 1938), then goes back to block 1934.

Figure 20A:
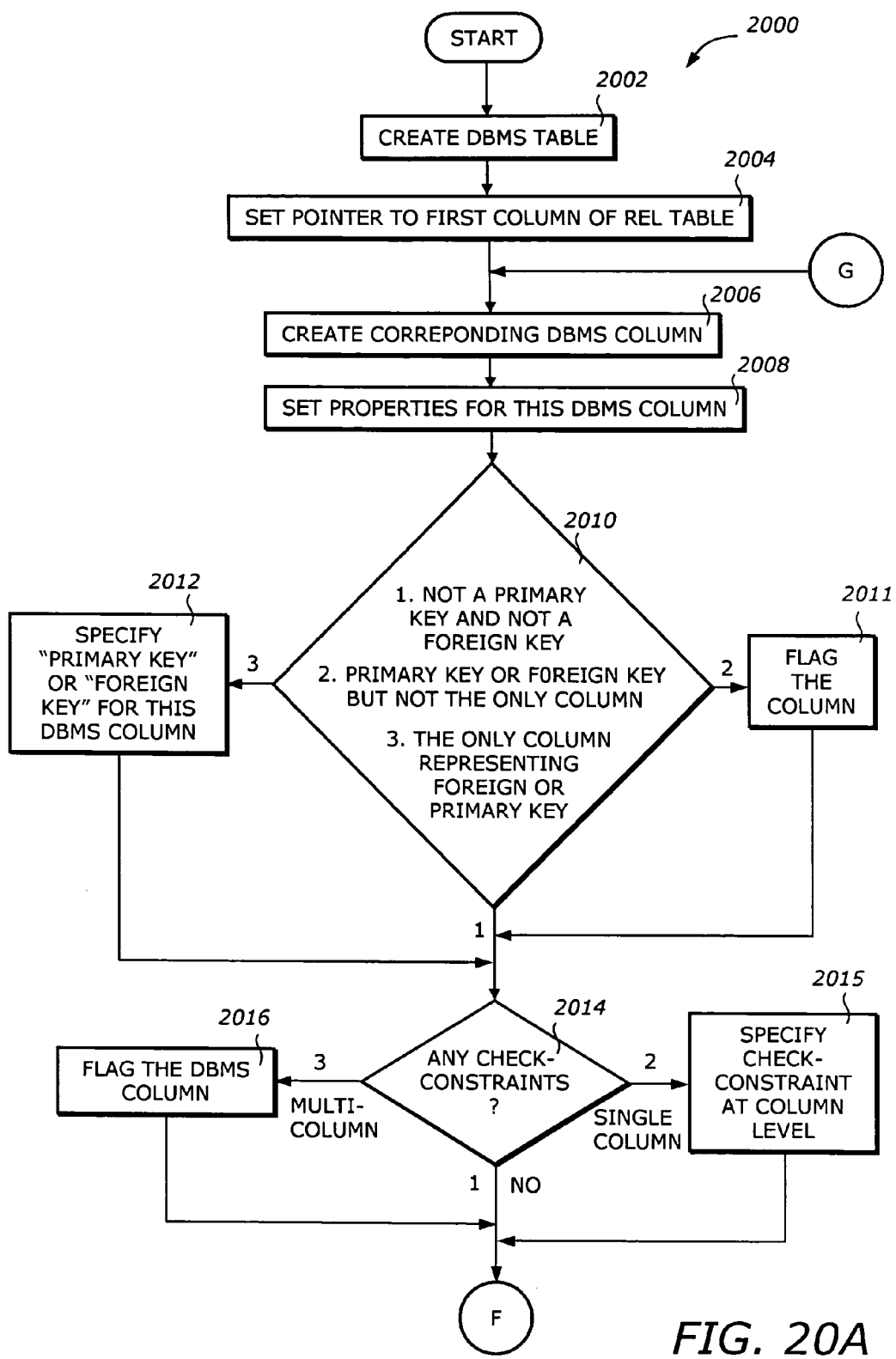
FIG. 20A and FIG. 20B are a flowchart of an embodiment 2000 of the process of creating a DBMS table to represent a relational table.
Figure 20B:
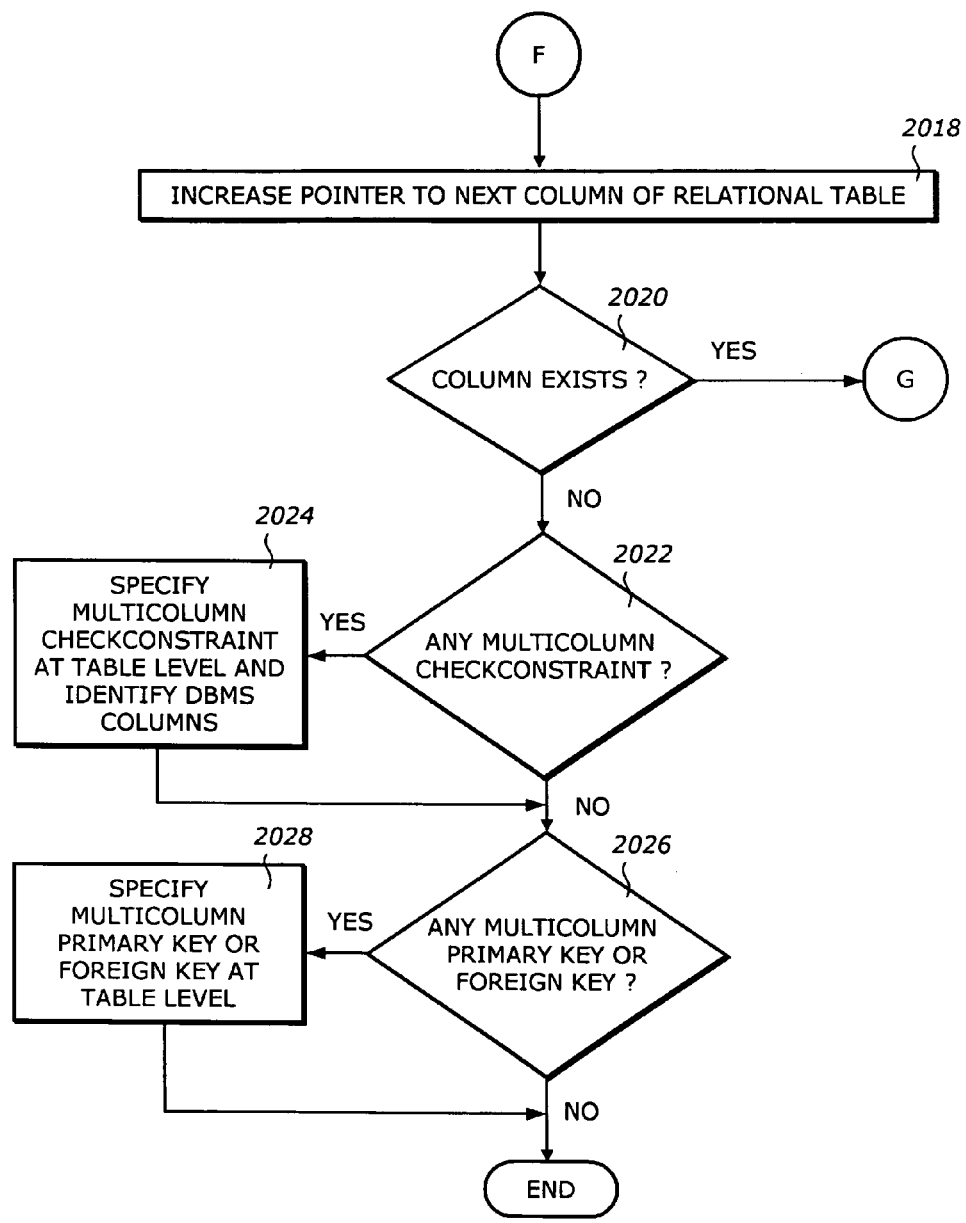

FIG. 20A and FIG. 20B are a flowchart of an embodiment 2000 of the process of creating a DBMS table to represent a relational table (e.g., block 2006 of FIG. 20). Process 2000 creates a DBMS table having DBMS columns representing respectively the columns of the relational table.

Upon Start, process 2000 creates a DBMS table (block 2002). This can be done by, for example, issuing a script "create table" statement. Process 2000 sets pointer to the first column of the relational table (block 2004). Process 2000 creates a DBMS column to represent this relational column (block 2006). Process 2000 sets the properties, including precision, scale, length, data type, IsNullable, CollationName, and CharacterisetName for the newly created DBMS column in accordance with the respective properties of the corresponding relational column (block 2008).

Process 2000 queries whether this relational column is (1) neither a primary key nor a foreign key, or (2) part of the primary key or foreign key but not the only one representing the primary key or foreign key, or (3) the only column that represents the primary key or foreign key (block 2010). If it is (1) neither a primary key nor a foreign key, process 2100 proceeds to block 2014. If it is (2) part of the primary key or foreign key but not the only one representing the primary key, process 2000 flags the DBMS column to so indicate (block 2011) then proceeds to block 2014. If it is (3) the only column that represents the primary key or foreign key, then process 2000 specifies this property of "primary key" or "foreign key" for the DBMS column (block 2012) and proceeds to block 2014. Process 2000 specifies a DBMS primary key by specifying the properties of the DBMS primary key in accordance with the properties of the relational primary key as stored in the CWM. Process 2000 specifies a DBMS foreign key by specifying the "child" DBMS table and the DBMS columns of this child DBMS table that are being imported, and specifies the properties of DBMS foreign key, including the "update" and "delete" referential integrity rules and the deferability type, in accordance with the properties of the corresponding relational foreign key.

Process 2000 queries whether there is any checkconstraint associated with this relational column (block 2014). The result of this query can only be one of the following: (1) there is no checkconstraint associated with this relational column, (2) there is a checkconstraint(s) associated with this relational column that does not involve any of the other relational columns, (3) there is a checkconstraint(s) associated with this relational column that also involves one or more of the other relational columns. If the query result is (1), process 2000 proceeds to block 2018 (FIG. 20B). If the query result is (2), the process 2000 specifies the checkconstraint(s) at column-level in the DBMS column (block 2015) then proceeds to block 2018. Process 2000 specifies a checkconstraint by specifying the parameters, i.e., the constraint expressions that describe the checkconstraint. If the query result is (3), process 2000 flags the DBMS column to so indicate (block 2016) then proceeds to block 2018. Process 2000 increases the pointer to the next column of the relational table (block 2018). Process 2000 checks whether the column exists (block 2020). If the column exists, process 2000 goes back to block 2006 and proceeds as previously described.

If the relational column does not exist, this means that all the necessary DBMS columns have been created. Process 2000 checks whether there is any checkconstraint(s) that involves multiple columns of the relational table, which consequently, involves multiple columns of the corresponding DBMS table (block 2022). If there is none, process 2000 proceeds to block 2026. Otherwise, process 2000 specifies the checkconstraint(s) at the table level in the DBMS table and identifies the DBMS columns that are associated with this checkconstraint (block 2024), then proceeds to block 2026. Process 2000 checks whether there is a multi-column primary key or a multi-column foreign key in the relational table (block 2026). If there is none, process 2000 terminates. Otherwise, process 2000 specifies the multi-column primary key or the multi-column foreign key in the DBMS table at table level and identifies the DBMS columns that represent the multi-column primary key or the multi-column foreign key (block 2028). Process 2000 then terminates.

Figure 21:
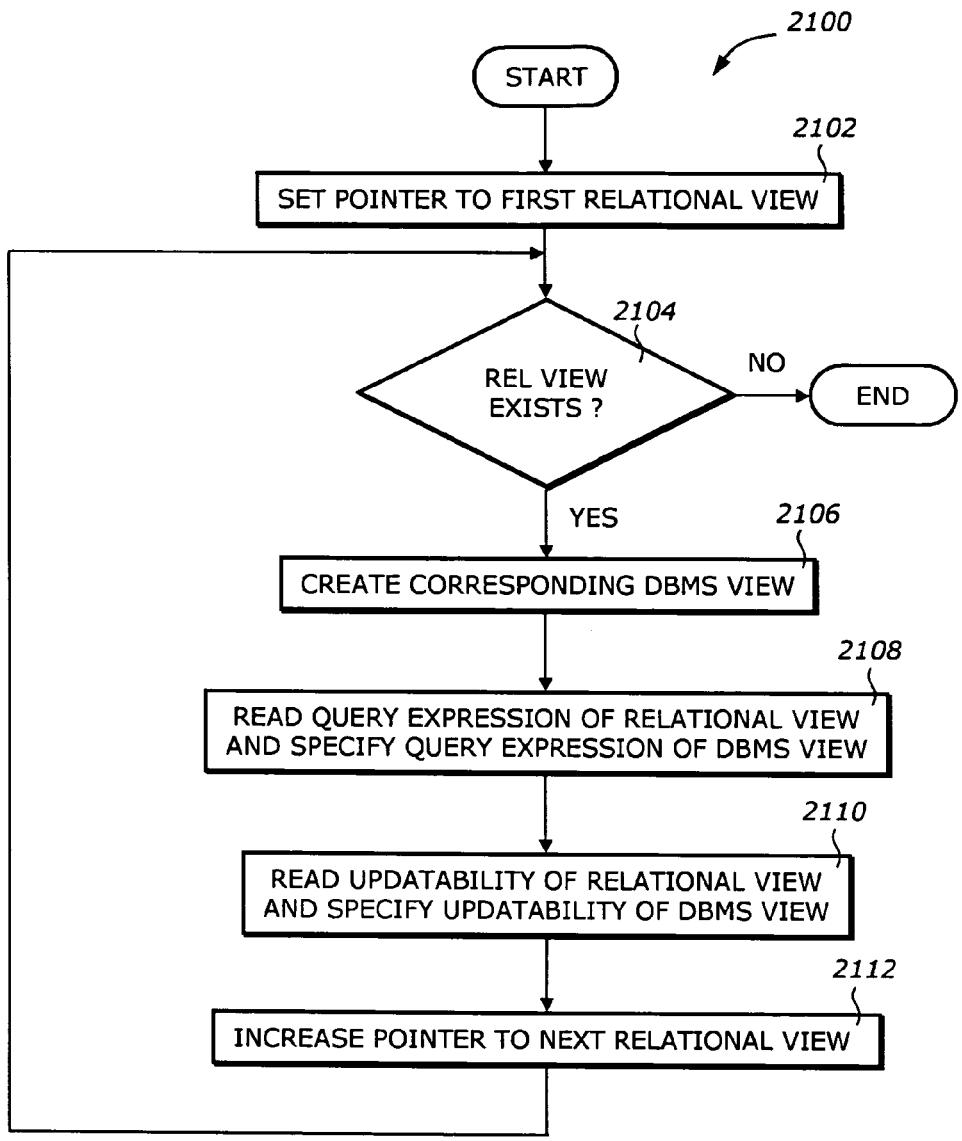
FIG. 21 is a flowchart of an embodiment 2100 of the process of processing the relational views for a relational schema.

FIG. 21 is a flowchart of an embodiment 2100 of the process of processing the relational views for a relational schema. Process 2100 is executed for each of the relational schemas.

Upon Start, process 2100 sets a pointer to the first element in the list of relational views (block 2102). Process 2100 checks whether this relational view exists (block 2104). If it does not exist, process 2100 terminates. If it exists, process 2100 creates a DBMS view to represent this relational view (block 2106). A relational view has two properties, namely, query expression and updatability. Query expression defines the relational view and is the main property of the relational view. Updatability is based on the IsReadOnly property. Process 2100 reads the query expression of the relational view and specifies the query expression for the DBMS view accordingly (block 2108). Process 2100 reads the updatability of the relational view and specifies the updatability for the DBMS view accordingly (block 2110). Process 2100 increases the pointer to point to the next relational view (block 2112), checks whether this next relational view exists (block 2104) and proceeds as previously described.

Figure 22:
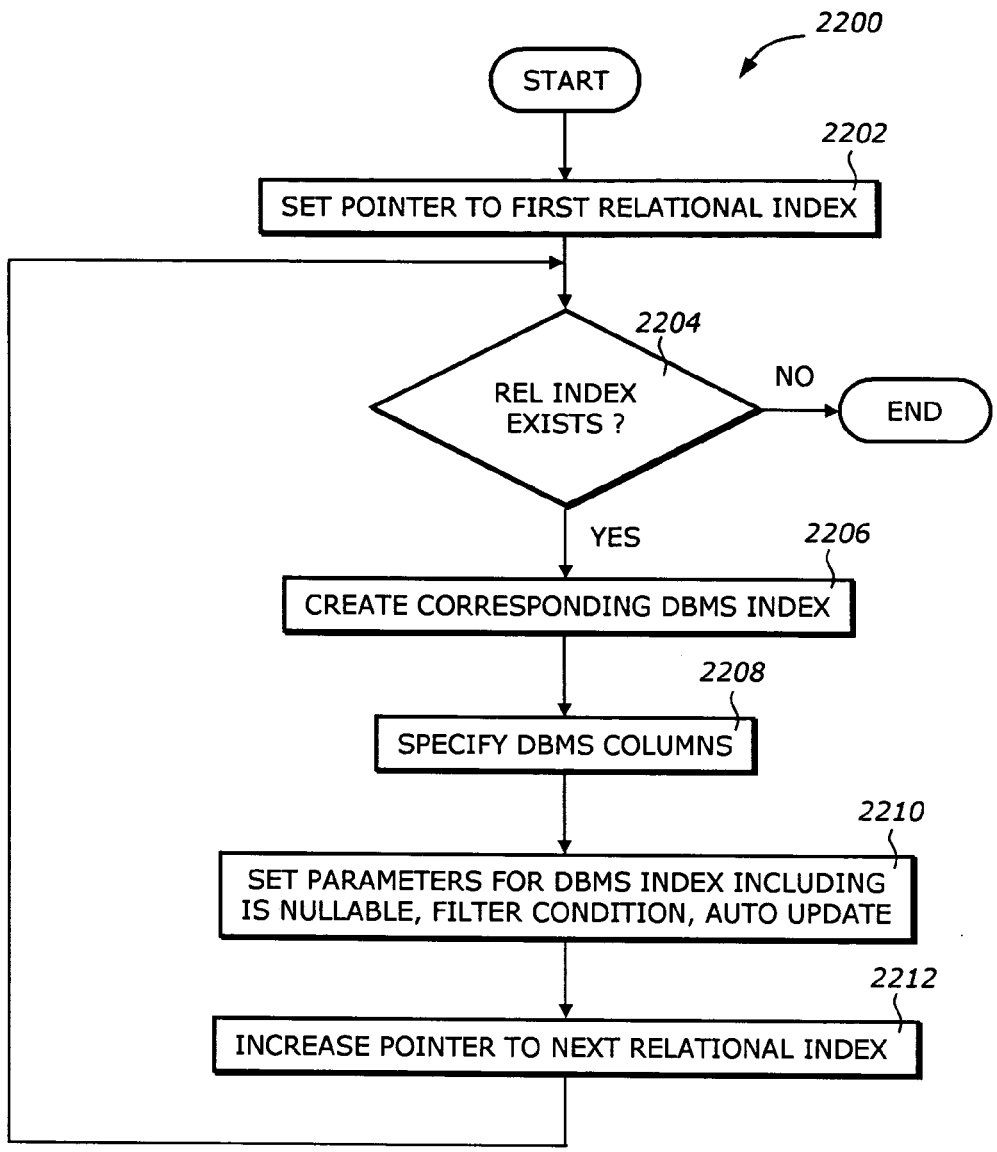
FIG. 22 is a flowchart of an embodiment 2200 of the process of processing the relational indices for a relational schema.

FIG. 22 is a flowchart of an embodiment 2200 of the process of processing the relational indices for a relational schema. Process 2200 is executed for each of the relational schemas.

Upon Start, process 2200 sets a pointer to the first element in the list of relational indices (block 2202). Process 2200 checks whether this relational index exists (block 2204). If it does not exist, process 2200 terminates. If it exists, process 2200 creates a DBMS index to represent this relational index (block 2206). This relational index uses certain relational columns. Process 2200 specifies all the DBMS columns that correspond to these relational columns (block 2208). Process 2200 sets the parameters for the DBMS index, including IsNullable, FilterCondition, and AutoUpdate parameters, in accordance with the parameters of the relational index (block 2210). Process 2200 increases the pointer to point to the next relational index (block 2212), checks whether this next relational index exists (block 2204) then proceeds as previously described.

Figure 23:
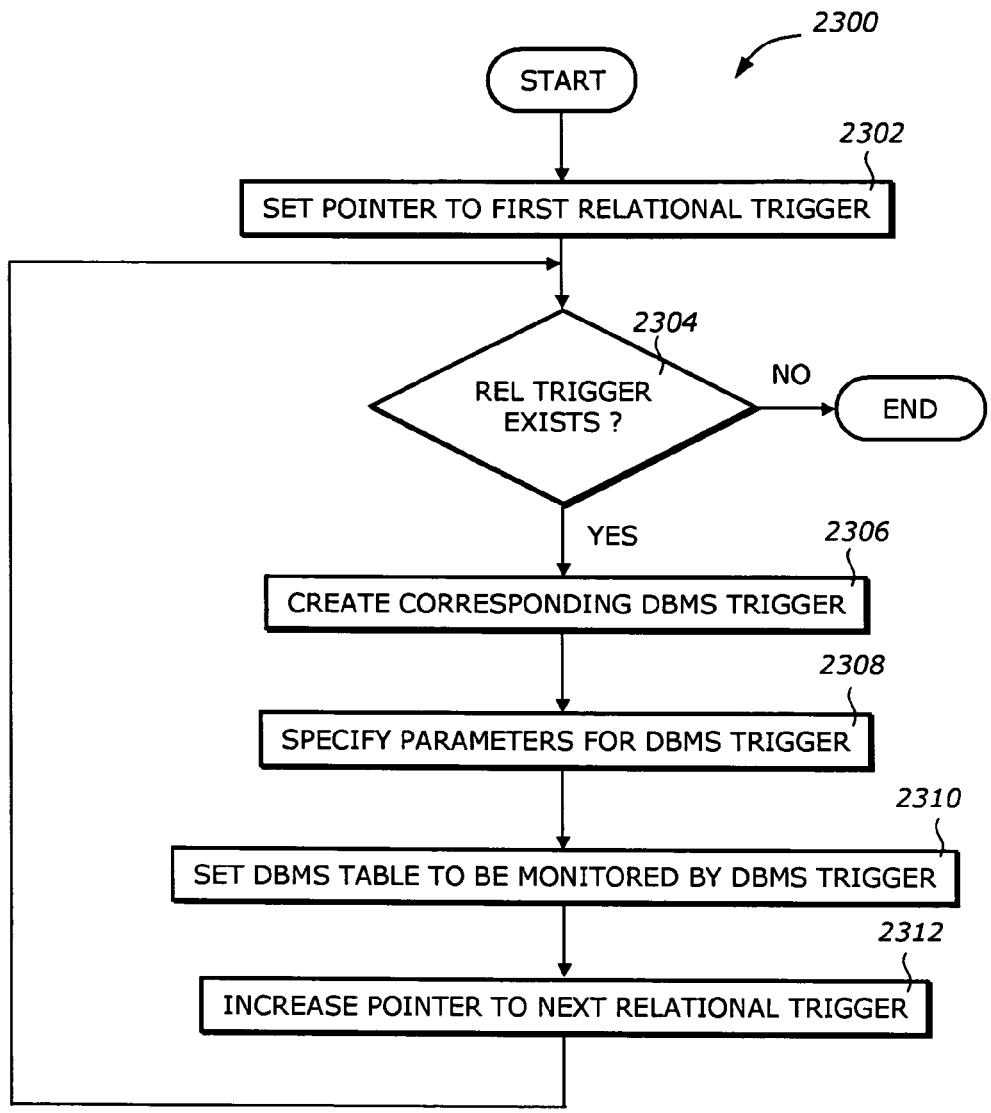
FIG. 23 is a flowchart of an embodiment 2300 of the process of processing the relational triggers for a relational schema.

FIG. 23 is a flowchart of an embodiment 2300 of the process of processing the relational triggers for a relational schema. Process 2300 is executed for each of the relational schemas.

Upon Start, process 2300 sets a pointer to the first element in the list of relational triggers (block 2302). Process 2300 checks whether this relational trigger exists (block 2304). If it does not exist, process 2300 terminates. If it exists, process 2300 creates a DBMS trigger to represent this relational trigger (block 2306). The relational trigger's properties are described by parameters. The parameters specify when the relational trigger is invoked and what action is to be taken when it is invoked. Process 2300 sets the parameters for the DBMS trigger that corresponds to the relational trigger in accordance with the relational triggers parameters (block 2308). The relational trigger monitors a specific relational table that corresponds to a specific DBMS table. Process 2300 sets this specific DBMS table for the DBMS trigger, i.e., provides the DBMS trigger with a link to this DBMS table (block 2310). Process 2300 increases the pointer to point to the next relational trigger (block 2312), checks whether this next relational trigger exists (block 2304) and proceeds as previously described.

Figure 24:
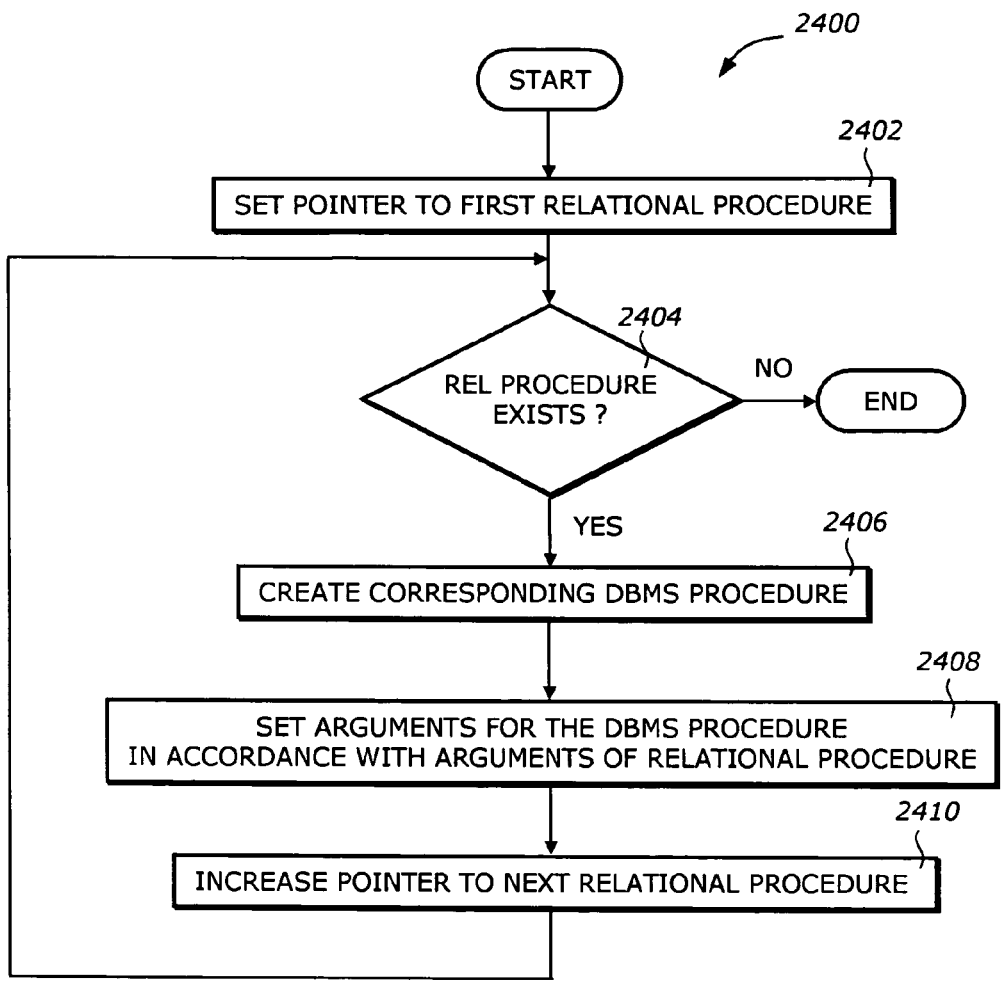
FIG. 24 is a flowchart of an embodiment 2400 of the process of processing the relational procedures for a relational schema.

FIG. 24 is a flowchart of an embodiment 2400 of the process of processing the relational procedures for a relational schema. Process 2400 is executed for each of the relational schemas.

Upon Start, process 2400 sets a pointer to the first element in the list of relational procedures (block 2402). Process 2400 checks whether this relational procedure exists (block 2404). If it does not exist, process 2400 terminates. If it exists, process 2400 creates a DBMS procedure to represent this relational procedure (block 2406). The relational procedure is described by a set of arguments. Process 2400 sets the arguments for the DBMS procedure in accordance with the arguments of relational procedure (block 2408). Process 2400 increases the pointer to point to the next relational procedure (block 2410), checks whether this next relational procedure exists (block 2404) then proceeds as previously described.

While certain exemplary embodiments have been described in detail and shown in the accompanying drawings, it is to be understood that such embodiments are merely illustrative of and not restrictive on the broad invention. It will thus be recognized that various modifications, such as those mentioned above, may be made to the illustrated and other embodiments of the invention described above, without departing from the broad inventive scope thereof. It will be understood, therefore, that the invention is not limited to the particular embodiments or arrangements disclosed, but is rather intended to cover any changes, adaptations or modifications which are within the scope and spirit of the invention as defined by the appended claims.

What is claimed is:

1. A method comprising:
    converting logical aspects comprising entity-relationship (ER) libraries, the ER libraries comprising ER models, the corresponding design items comprising design libraries and the design libraries comprising design models, of a common warehouse model (CWM) to corresponding design items for a relational database by:
    (a) scanning through the ER libraries;
    (b) for a first of the ER libraries, creating a corresponding first design library;
    (c) for each of the ER models in the first ER library, creating a corresponding design model in the corresponding first design library to hold corresponding information;
    (d) processing in a hierarchical manner each of the ER models to produce corresponding information for the corresponding design model;
    (e) determining whether there are any references between the ER models; and
    (f) whether there are any references between the ER models, specifying corresponding references in corresponding design models.

2. The method of claim 1 wherein, in operation (d), each of the ER models is processed independently.

3. The method of claim 1 wherein operation (d) comprises:
    processing ER subject areas included in a first of the ER models;
    processing ER domains included in the first ER model;
    processing domain inheritance for each of the ER domains;
    processing ER entities included in the first ER model;
    processing entity subtype relationships in the first ER model; and
    processing non-subtype relationships in the first ER model.

4. The method of claim 3 wherein processing ER subject areas comprises:
    for each of the ER subject areas included in the first ER model, creating a corresponding design subject area in the corresponding first design model.

5. The method of claim 3 wherein processing domains comprises:
    for each of the ER domains included in the first ER model, creating a corresponding design domain in the corresponding first design model;
    determining parameters for each of the ER domains, including base type, default and constraint; and
    setting corresponding parameters for each of the corresponding design domains.

6. The method of claim 3 wherein processing domain inheritance comprises:
    determining, for a first of the ER domains, whether there is a first generalization in the CWM that links the first ER domain;
    if there is the first generalization, determining parent ER domain and child ER domain for the first generalization, the parent and child ER domains corresponding to corresponding parent and child design domains; and
    creating inheritance link from the corresponding child design domain to the corresponding parent design domain.

7. The method of claim 3 wherein processing ER entities comprises:
    for a first ER entity included in the first ER model, creating a corresponding first design entity in the corresponding first design model;
    determining first ER subject areas associated with the first ER entity, the first ER subject areas corresponding to first design subject areas;
    adding the corresponding first design entity as a member of the corresponding first design subject areas; and
    processing attributes associated with the first ER entity.

8. The method of claim 7 wherein processing attributes associated with the first ER entity comprises:
    creating a first design attribute to correspond to the first ER attribute;
    attaching the design attribute to the first design entity;
    setting type reference of the first design attribute;

determining whether the first ER attribute is part of a first ER primary key associated with the first ER entity; and if the first ER attribute is part of the first ER primary key, flagging the first design attribute as part of a first design primary key associated with the first design entity.

9. The method of claim 3 wherein processing entity subtype relationships comprises:
    determining whether there is a first CWM generalization that links two of the ER entities in the first ER model;
    if there is the first CWM generalization, determining parent and child ER entities for the first CWM generalization, the parent and child ER entities corresponding to corresponding parent and child design entities; and
    creating inheritance link from the corresponding child design entity to the corresponding parent design entity.

10. The method of claim 3 wherein processing non-subtype relationships comprises:
    obtaining references to parent and child ER entities in a first ER relationship, the parent and child ER entities corresponding to parent and child design entities in the first design model;
    creating a corresponding design link between the corresponding parent and child design entities in the first design model;
    setting cardinality and relationship type for the corresponding design link;
    determining whether first ER relationship has at least one referential rule; and
    if the first ER relationship has at least one referential rule, processing the at least one referential rule.

11. The method of claim 10 wherein processing the at least one referential rule comprises:
    obtaining parameters including "insert", "update" and "delete" from the CWM;
    setting corresponding parameters for the corresponding design link;
    determining whether there is an ER attribute in the child ER entity that has migrated from the parent ER entity; and
    if there is such an ER attribute corresponding to a design attribute, then:
        creating a design foreign key under the child design entity; and
    creating references to the corresponding design attribute.

12. A method comprising:
    converting logical aspects comprising entity-relationship (ER) libraries, the ER libraries comprising ER models, the corresponding design items comprising design libraries, the design libraries comprising design models, of a common warehouse model (CWM) to corresponding design items for a relational database by:
    (a) scanning through the ER libraries;
    (b) for a first of the ER libraries, creating a corresponding first design library;
    (c) for each of the ER models in the first ER library, creating a corresponding design model in the corresponding first design library to hold corresponding information;
    (d) processing in a hierarchical manner each of the ER models to produce corresponding information for the corresponding design model;
    (e) determining whether there are any references between the ER models; and
    (f) whether there are any references between the ER models, specifying corresponding references in corresponding design models; and
    converting physical aspects of a common warehouse model (CWM) to corresponding database management system (DBMS) items in a relational database by processing in a hierarchical manner the physical aspects and creating the corresponding DBMS items, the physical aspects comprising relational catalogs, the relational catalogs comprising relational schemas, the corresponding DBMS items comprising DBMS catalogs, the DBMS catalogs comprising DBMS schemas.

13. The method of claim 12 wherein converting physical aspects comprises:
    (g) scanning through the relational catalogs;
    (h) for a first of the relational catalogs, creating a corresponding first DBMS catalog in the relational database;
    (i) for each of the relational schemas in the first relational catalog, creating a corresponding DBMS schema in the corresponding DBMS catalog to hold corresponding information; and
    (j) processing each of the relational schemas to produce corresponding information for the corresponding DBMS schema.

14. An article of manufacture comprising:
    a machine-accessible storage medium storing data that, when accessed by a machine, cause the machine to perform the operation of:
    converting logical aspects comprising entity-relationship (ER) libraries, the ER libraries comprising ER models, the corresponding design items comprising design libraries, the design libraries comprising design models, of a common warehouse model (CWM) to corresponding design items for a relational database by:
    (a) scanning through the ER libraries;
    (b) for a first of the ER libraries, creating a corresponding first design library;
    (c) for each of the ER models in the first ER library, creating a corresponding design model in the corresponding first design library to hold corresponding information;
    (d) processing in a hierarchical manner each of the ER models to produce corresponding information for the corresponding design model;
    (e) determining whether there are any references between the ER models; and
    (f) whether there are any references between the ER models, specifying corresponding references in corresponding design models.

15. The article of manufacture of claim 14 wherein, in operation (d), each of the ER models is processed independently.

16. The article of manufacture of claim 14 wherein operation (d) comprises the operations of:
    processing ER subject areas included in a first of the ER models;
    processing ER domains included in the first ER model;
    processing domain inheritance for each of the ER domains;
    processing ER entities included in the first ER model;
    processing entity subtype relationships in the first ER model; and
    processing non-subtype relationships in the first ER model.

17. The article of manufacture of claim 16 wherein the operation of processing ER subject areas comprises:
    for each of the ER subject areas included in the first ER model, creating a corresponding design subject area in the corresponding first design model.

18. The article of manufacture of claim 16 wherein the operation of processing domains comprises:
    for each of the ER domains included in the first ER model, creating a corresponding design domain in the corresponding first design model;

determining parameters for each of the ER domains, including base type, default and constraint; and setting corresponding parameters for each of the corresponding design domains.

19. The article of manufacture of claim 16 wherein the operation of processing domain inheritance comprises:

determining, for a first of the ER domains, whether there is a first generalization in the CWM that links the first ER domain;

if there is the first generalization, determining parent ER domain and child ER domain for the first generalization, the parent and child ER domains corresponding to corresponding parent and child design domains; and creating inheritance link from the corresponding child design domain to the corresponding parent design domain.

20. The article of manufacture of claim 16 wherein the operation of processing ER entities comprises:

for a first ER entity included in the first ER model, creating a corresponding first design entity in the corresponding first design model;

determining first ER subject areas associated with the first ER entity, the first ER subject areas corresponding to first design subject areas;

adding the corresponding first design entity as a member of the corresponding first design subject areas; and processing attributes associated with the first ER entity.

21. The article of manufacture of claim 20 wherein the operation of processing attributes associated with the first ER entity comprises:

creating a first design attribute to correspond to the first ER attribute;

attaching the design attribute to the first design entity;

setting type reference of the first design attribute;

determining whether the first ER attribute is part of a first ER primary key associated with the first ER entity; and if the first ER attribute is part of the first ER primary key, flagging the first design attribute as part of a first design primary key associated with the first design entity.

22. The article of manufacture of claim 16 wherein the operation of processing entity subtype relationships comprises:

determining whether there is a first CWM generalization that links two of the ER entities in the first ER model;

if there is the first CWM generalization, determining parent and child ER entities for the first CWM generalization, the parent and child ER entities corresponding to corresponding parent and child design entities; and creating inheritance link from the corresponding child design entity to the corresponding parent design entity.

23. The article of manufacture of claim 16 wherein the operation of processing non-subtype relationships comprises:

obtaining references to parent and child ER entities in a first ER relationship, the parent and child ER entities corresponding to parent and child design entities in the first design model;

creating a corresponding design link between the corresponding parent and child design entities in the first design model;

setting cardinality and relationship type for the corresponding design link;

determining whether first ER relationship has at least one referential rule; and if the first ER relationship has at least one referential rule, processing the at least one referential rule.

24. The article of manufacture of claim 23 wherein the operation of processing the at least one referential rule comprises:

obtaining parameters including "insert", "update" and "delete" from the CWM;

setting corresponding parameters for the corresponding design link;

determining whether there is an ER attribute in the child ER entity that has migrated from the parent ER entity; and if there is such an ER attribute corresponding to a design attribute, then:

creating a design foreign key under the child design entity; and creating references to the corresponding design attribute.

25. A system comprising:

a processor; and a memory coupled to the processor, the memory containing program code that, then executed by the processor, causes the processor to perform the operation of:

converting logical aspects comprising entity-relationship (ER) libraries, the ER libraries comprising ER models, the corresponding design items comprising design libraries, the design libraries comprising design models of a common warehouse model (CWM) to corresponding design items for a relational database by:

(a) scanning through the ER libraries;

(b) for a first of the ER libraries, creating a corresponding first design library;

(c) for each of the ER models in the first ER library, creating a corresponding design model in the corresponding first design library to hold corresponding information;

(d) processing in a hierarchical manner each of the ER models to produce corresponding information for the corresponding design model;

(e) determining whether there are any references between the ER models; and (f) whether there are any references between the ER models, specifying corresponding references in corresponding design models.

26. The system of claim 25 wherein, in operation (d), each of the ER models is processed independently.

27. The system of claim 25 wherein operation (d) comprises:

processing ER subject areas included in a first of the ER models;

processing ER domains included in the first ER model;

processing domain inheritance for each of the ER domains;

processing ER entities included in the first ER model;

processing entity subtype relationships in the first ER model; and processing non-subtype relationships in the first ER model.

28. The system of claim 27 wherein the operation of processing ER subject areas comprises:

for each ER subject area included in the first ER model, creating a corresponding design subject area in the corresponding first design model.

29. The system of claim 27 wherein the operation of processing domains comprises:

for each of the ER domains included in the first ER model, creating a corresponding design domain in the corresponding first design model;

determining parameters for each of the ER domains, including base type, default and constraint; and setting corresponding parameters for each of the corresponding design domains.

30. The system of claim 27 wherein the operation of processing domain inheritance comprises:
- determining, for a first of the ER domains, whether there is a first generalization in the CWM that links the first ER domain;
- if there is the first generalization, determining parent ER domain and child ER domain for the first generalization, the parent and child ER domains corresponding to corresponding parent and child design domains; and
- creating inheritance link from the corresponding child design domain to the corresponding parent design domain.

31. The system of claim 27 wherein the operation of processing ER entities comprises:
- for a first ER entity included in the first ER model, creating a corresponding first design entity in the corresponding first design model;
- determining first ER subject areas associated with the first ER entity, the first ER subject areas corresponding to first design subject areas;
- adding the corresponding first design entity as a member of the corresponding first design subject areas; and
- processing attributes associated with the first ER entity.

32. The system of claim 31 wherein the operation of processing attributes associated with the first ER entity comprises:
- creating a first design attribute to correspond to the first ER attribute;
- attaching the design attribute to the first design entity;
- setting type reference of the first design attribute;
- determining whether the first ER attribute is part of a first ER primary key associated with the first ER entity; and
- if the first ER attribute is part of the first ER primary key, flagging the first design attribute as part of a first design primary key associated with the first design entity.

33. The system of claim 27 wherein the operation of processing entity subtype relationships comprises:
- determining whether there is a first CWM generalization that links two of the ER entities in the first ER model;
- if there is the first CWM generalization, determining parent and child ER entities for the first CWM generalization, the parent and child ER entities corresponding to corresponding parent and child design entities; and
- creating inheritance link from the corresponding child design entity to the corresponding parent design entity.

34. The system of claim 27 wherein the operation of processing non-subtype relationships comprises:
- obtaining references to parent and child ER entities in a first ER relationship having ends, the parent and child ER entities corresponding to parent and child design entities in the relational database;
- creating corresponding link between the corresponding parent and child design entities in the relational database;
- setting cardinality and relationship type for the corresponding link;
- determining whether the ends of the first ER relationship have at least one referential rule;
- if the ends of the first ER relationship have at least one referential rule, processing the at least one referential rule.

35. The system of claim 10 wherein the operation of processing the at least one referential rule comprises:
- obtaining parameters including "insert", "update" and "delete" from the CWM;
- setting corresponding parameters for the corresponding design link;
- determining whether there is an ER attribute in the child ER entity that has migrated from the parent ER entity; and
- if there is such an ER attribute corresponding to a design attribute, then:
  - creating a design foreign key under the child design entity; and
  - creating references to the corresponding design attribute.

* * * * *